(12) United States Patent
Gupta et al.

(10) Patent No.: US 7,970,698 B2
(45) Date of Patent: Jun. 28, 2011

(54) APPLICATION PROCESSING AND DECISION SYSTEMS AND PROCESSES

(75) Inventors: Sandeep Gupta, Alpharetta, GA (US); Christian Hall, Canton, GA (US); James Reid, Alpharetta, GA (US); Shen Lu, Duluth, GA (US); Dennis Horton, Buford, GA (US); Lee Grice, Cumming, GA (US); Thresa Dixon, Canton, GA (US); Scott Garten, Canton, GA (US); Sudhakar Reddy, Suwanee, GA (US)

(73) Assignee: Equifax, Inc., Atlanta, GA (US)

( * ) Notice: Subject to any disclaimer, the term of this patent is extended or adjusted under 35 U.S.C. 154(b) by 511 days.

(21) Appl. No.: 10/546,931

(22) PCT Filed: Aug. 27, 2004

(86) PCT No.: PCT/US2004/028020
§ 371 (c)(1),
(2), (4) Date: Aug. 10, 2006

(87) PCT Pub. No.: WO2005/022348
PCT Pub. Date: Mar. 10, 2005

(65) Prior Publication Data
US 2007/0022027 A1    Jan. 25, 2007

Related U.S. Application Data

(60) Provisional application No. 60/498,395, filed on Aug. 27, 2003.

(51) Int. Cl.
*G06Q 40/00* (2006.01)
(52) U.S. Cl. ............................. 705/38; 705/39
(58) Field of Classification Search ...................... 705/38
See application file for complete search history.

(56) References Cited

U.S. PATENT DOCUMENTS 5,262,941 A   11/1993  Saladin et al.
5,404,509 A    4/1995  Klein
(Continued)

FOREIGN PATENT DOCUMENTS
WO   WO2004/114160 A2   12/2004
(Continued)

OTHER PUBLICATIONS

International Search Report in related Application No. PCT/US04/28020.
(Continued)

*Primary Examiner* — Hani Kazimi
*Assistant Examiner* — Hatem Ali
(74) *Attorney, Agent, or Firm* — Kilpatrick Townsend & Stockton LLP

(57) ABSTRACT

The present invention relates to automated decisioning for a credit request associated with an applicant. Information associated with an applicant is received. Data associated with the applicant is received from at least one data source. A user interface is configured to allow a user to provide a definition of decision rules in a near-natural language. Information associated with the decision rules is determined based on the definition of the decision rules. A selection of rule flow information associated with the decision rules is received through the user computer interface. A decision is generated based on the information associated with the applicant, data associated with the applicant from the at least one data source, the information associated with the decision rules, and the selection of information associated with decision rules. The decision is displayed.

36 Claims, 24 Drawing Sheets

U.S. PATENT DOCUMENTS

| | | | |
|---|---|---|---|
| 5,414,838 A | 5/1995 | Kolton et al. | |
| 5,583,760 A | 12/1996 | Klesse | |
| 5,696,907 A | 12/1997 | Tom | |
| 5,721,903 A | 2/1998 | Anand et al. | |
| 5,778,357 A | 7/1998 | Kolton et al. | |
| 5,797,133 A | 8/1998 | Jones et al. | |
| 5,870,721 A | 2/1999 | Norris | |
| 5,926,784 A | 7/1999 | Richardson et al. | |
| 5,930,764 A * | 7/1999 | Melchione et al. | 705/10 |
| 5,940,811 A | 8/1999 | Norris | |
| 5,963,894 A | 10/1999 | Richardson et al. | |
| 6,052,694 A | 4/2000 | Bromberg | |
| 6,067,549 A | 5/2000 | Smalley et al. | |
| 6,073,129 A | 6/2000 | Levine et al. | |
| 6,088,686 A | 7/2000 | Walker et al. | |
| 6,105,007 A | 8/2000 | Norris | |
| 6,163,781 A | 12/2000 | Wess, Jr. | |
| 6,240,422 B1 | 5/2001 | Atkins et al. | |
| 6,256,640 B1 | 7/2001 | Smalley et al. | |
| 6,263,447 B1 | 7/2001 | French et al. | |
| 6,282,658 B2 | 8/2001 | French et al. | |
| 6,285,998 B1 | 9/2001 | Black et al. | |
| 6,295,536 B1 | 9/2001 | Sanne | |
| 6,321,206 B1 | 11/2001 | Honarvar | |
| 6,321,339 B1 | 11/2001 | French et al. | |
| 6,343,279 B1 | 1/2002 | Bissonette et al. | |
| 6,356,903 B1 | 3/2002 | Baxter et al. | |
| 6,401,098 B1 | 6/2002 | Moulin | |
| 6,405,173 B1 | 6/2002 | Honarvar et al. | |
| 6,415,259 B1 | 7/2002 | Wolfinger et al. | |
| 6,415,298 B1 | 7/2002 | Oesterer et al. | |
| 6,424,979 B1 | 7/2002 | Livingston et al. | |
| 6,430,545 B1 | 8/2002 | Honarvar et al. | |
| 6,430,556 B1 | 8/2002 | Goldberg et al. | |
| 6,456,986 B1 | 9/2002 | Boardman et al. | |
| 6,463,439 B1 | 10/2002 | Dahlberg | |
| 6,496,936 B1 | 12/2002 | French et al. | |
| 6,523,028 B1 | 2/2003 | DiDomizio et al. | |
| 6,532,450 B1 | 3/2003 | Brown et al. | |
| 6,546,545 B1 | 4/2003 | Honarvar et al. | |
| 6,557,009 B1 | 4/2003 | Singer et al. | |
| 6,598,067 B1 | 7/2003 | Wydra et al. | |
| 6,601,034 B1 | 7/2003 | Honarvar et al. | |
| 6,606,740 B1 | 8/2003 | Lynn et al. | |
| 6,609,120 B1 | 8/2003 | Honarvar et al. | |
| 6,611,809 B1 | 8/2003 | McCalden | |
| 6,621,930 B1 | 9/2003 | Smadja | |
| 6,643,625 B1 | 11/2003 | Acosta et al. | |
| 6,684,192 B2 | 1/2004 | Honarvar et al. | |
| 6,741,982 B2 | 5/2004 | Soderstrom et al. | |
| 6,823,319 B1 | 11/2004 | Lynch et al. | |
| 7,003,560 B1 | 2/2006 | Mullen et al. | |
| 7,010,546 B1 | 3/2006 | Kolawa et al. | |
| 7,136,873 B2 | 11/2006 | Smith et al. | |
| 7,181,438 B1 | 2/2007 | Szabo | |
| 7,191,150 B1 | 3/2007 | Shao et al. | |
| 7,380,213 B2 | 5/2008 | Pokorny et al. | |
| 7,747,559 B2 | 6/2010 | Leitner et al. | |
| 2002/0026443 A1 | 2/2002 | Chang et al. | |
| 2002/0040339 A1* | 4/2002 | Dhar et al. | 705/38 |
| 2002/0069193 A1 | 6/2002 | Beavin et al. | |
| 2002/0077964 A1 | 6/2002 | Brody et al. | |
| 2002/0116244 A1 | 8/2002 | Honarvar et al. | |
| 2003/0033289 A1 | 2/2003 | Brinker et al. | |
| 2003/0110112 A1 | 6/2003 | Johnson et al. | |
| 2003/0120529 A1 | 6/2003 | Honarvar et al. | |
| 2003/0144950 A1* | 7/2003 | O'Brien et al. | 705/38 |
| 2003/0163414 A1 | 8/2003 | O'Brien et al. | |
| 2003/0177079 A1 | 9/2003 | Krajewski et al. | |
| 2003/0195828 A1 | 10/2003 | Honarvar et al. | |
| 2003/0204426 A1 | 10/2003 | Honarvar et al. | |
| 2004/0039687 A1 | 2/2004 | Lent et al. | |
| 2004/0054610 A1* | 3/2004 | Amstutz et al. | 705/36 |
| 2004/0078320 A1* | 4/2004 | DeFrancesco et al. | 705/38 |
| 2004/0088158 A1 | 5/2004 | Sheu et al. | |
| 2004/0098359 A1 | 5/2004 | Bayliss et al. | |
| 2004/0098371 A1 | 5/2004 | Bayliss et al. | |
| 2004/0098372 A1 | 5/2004 | Bayliss et al. | |
| 2004/0098373 A1 | 5/2004 | Bayliss et al. | |
| 2004/0098374 A1 | 5/2004 | Bayliss et al. | |
| 2004/0098390 A1 | 5/2004 | Bayliss et al. | |
| 2004/0148271 A1* | 7/2004 | Wood | 707/1 |
| 2005/0086579 A1 | 4/2005 | Leitner | |
| 2005/0154692 A1 | 7/2005 | Jacobsen et al. | |
| 2007/0179827 A1 | 8/2007 | Gupta | |
| 2009/0044096 A1 | 2/2009 | Gupta et al. | |
| 2009/0048999 A1 | 2/2009 | Gupta et al. | |
| 2009/0112753 A1 | 4/2009 | Gupta et al. | |

FOREIGN PATENT DOCUMENTS

| | | |
|---|---|---|
| WO | WO2005/022348 A2 | 3/2005 |
| WO | WO 2009/021011 | 2/2009 |

OTHER PUBLICATIONS

Seisint™ Brochure Entitled "Seisint Data Supercomputer Overview,"pp. 1-7, Version 1.0, Mar. 2004.

Evans, et al., "Specifications" Online!, XP002315765 Martin Fowler Homepage http://martinfowler.com/apsupp/spec.pd, pp. 1-19 (Mar. 23, 2003).

Fowler, "Patterns of Enterprise Application Architecture," Addison Wesley and Benjamin Cummings, XP002315766, pp. 316-327 (Nov. 2002).

Han, Jiawei, et al., *Data Mining: Concepts and Techniques*, Morgan Kaufman Publishers, 340 Pine Street, $6^{th}$ Floor, San Francisco, California, XP002332057, pp. 5-15, 23, 45-47, 58-61, 119-121, 453-454 (2001).

Lobel, Guido, et al., "Lexikon der Datenverarbeitung," Verlag Moderne Industrie, 8910 Landsberg, Germany, XP002332058, pp. 656-663 (1982).

Pressman, "Software Engineering: A Practitioner's Approach," McGraw Hill Publishing Company, Shoppenhangers Road, Maidenhead, Berkshire SL6 2QL, XP002315833, pp. 610-616 (1994).

Rob, Peter, et al., "Database Systems: Design, Implementation and Management, $2^{nd}$ Edition," International Thomson Publishing Inc., One Corporate Place, Ferncroft Village, Danvers, Massachusetts 01923 USA, p. 125-130 (1995).

International Search Report in related Application No. PCT/US2004/019136.

Zoot Enterprises, Inc. CB Manual, Bozeman, MT (Sep. 24, 2000).

Zoot Enterprises, Inc., untitled, Bozeman, MT (Jun. 10, 1996).

Zoot Enterprises, Inc., WebRules: Release 5.0 Enhancements, Bozeman, MT (Dec. 16, 2002).

Zoot Enterprises, Inc., Web Applications, Bozeman, MT (2004).

Zoot Enterprises, Inc., WebRules: Criteria Development Tool, Functionality Summary, Version 5.0, Bozeman, MT (2003).

Zoot Enterprises, Inc., WebRules: Zoot Criteria Development Tool, Release Notes, Version 5.0 Production Install, Bozeman, MT (Jul. 7, 2003).

Zoot Enterprises, Inc., SPOC Decision Engine, Bozeman, MT (2003).

International Application Serial No. PCT/US2008/072297, Search Report and Written Opinion dated Mar. 30, 2009.

Non-Final Office Action for U.S. Appl. No. 10/868,476, mailed Nov. 10, 2008.

Final Office Action for U.S. Appl. No. 10/868,476, mailed Feb. 23, 2009.

International Preliminary Report on Patentability and Written Opinion in related Application No. PCT/US2004/019136, dated Dec. 13, 2005.

International Preliminary Report on Patentability and Written Opinion in related Application No. PCT/US2004/028020, dated Apr. 17, 2007.

Amendment and Response to Final Office Action for U.S. Appl. No. 10/868,476, filed Jun. 17, 2009.

Non-Final Office Action for U.S. Appl. No. 12/257,442, mailed Jul. 2, 2009.

Friedland, Marc "CUs move toward industry-specific scoring," Credit Union News, v15, n16, two pages (Aug. 25,1995).

Anonymous, ABA Bank Compliance, v17, n5, "Credit scoring primer," two pages (May 8, 1996).

Computer Finance, v7, n8, "The Data Clean-Up Payback Calculation—Pt.1," seven pages (Jan. 1, 1997).

Aleskerov, et al., "CARDWATCH: a neural network based database mining system for credit card fraud detection," ABSTRACT, Proceedings of the IEEE/IAFE 1997 Computational Intelligence for Financial Engineering (CIFEr), one page (Mar. 24-25, 1997).

Business Wire, "QSpace.com Teams with the Forms Group to Offer Instant Web-Loan Decisioning to Community Banks," three pages (Mar. 22, 2000).

Knauf, Lynn "Insurers look to demystify credit scoring," National Underwriter, v105, n50; three pages (Dec. 10, 2001).

Rezaee, et al., "Continuous auditing: Building automated auditing capability," Auditing, V21, n1, eighteen pages (Mar. 2002).

Non-Final Office Action for U.S. Appl. No. 12/257,442 mailed Feb. 2, 2010, fifteen pages.

Notice of Allowance and Interview Summary for U.S. Appl. No. 10/868,476, mailed Feb. 17, 2010, twelve pages.

Amendment and Response to Non-Final Office Action for U.S. Appl. No. 12/257,453, filed Dec. 30, 2009, thirteen pages.

Final Office Action for U.S. Appl. No. 12/257,453, mailed Mar. 30, 2010, sixteen pages.

Amendment and Response to Final Office Action for U.S. Appl. No. 12/257,453, filed May 28, 2010, seventeen pages.

Non-Final Office Action for U.S. Appl. No. 12/257,442, mailed Jul. 8, 2010, sixteen pages.

Response to Non-Final Office Action for U.S. Appl. No. 12/257,442, filed Aug. 20, 1010, twenty pages.

Amendment and Response to Final Office Action for U.S. Appl. No. 12/257,442, filed Sep. 15, 2010, (22 pages).

Non-Final Office Action for U.S. Appl. No. 10/868,476, mailed Sep. 22, 2009.

Amendment and Response to non-final Office Action for U.S. Appl. No. 12/257,442 filed Oct. 2, 2009.

Non-Final Office Action for U.S. Appl. No. 12/257,453, mailed Oct. 2, 2009.

Non-Final Office Action for U.S. Appl. No. 12/186,682, mailed Mar. 29, 2011 (17 pages).

* cited by examiner

| Multi-Screen 2.0 | Beacon 96 | Decision Status | Decision | DDA | PLOC | Credit Card |
|---|---|---|---|---|---|---|
| A | $0 \leq v \leq 680$ | declined | Declined | — | — | — |
|   | $551 \leq v \leq 740$ | approved with offers | Approved A... | Offer Free | $2,500 | Gold $7,500 |
|   | $741 \leq v \leq 760$ | approved with offers | Approved A... | Offer Free | $2,500 | Gold $10,000 |
|   | $\leq v \leq 761$ | approved with offers | Approved A... | Offer Free | $2,500 | Gold $10,000 |
| B | $0 \leq v \leq 660$ | declined | Declined | — | — | — |
|   | $661 \leq v \leq 700$ | approved with offers | Approved A... | Offer Basic | $2,000 | Basic $4,000 |
|   | $701 \leq v \leq 760$ | approved with offers | Approved A... | Offer Free | $2,000 | Gold $5,000 |
|   | $\leq v \leq 761$ | approved with offers | Approved A... | Offer Free | $2,000 | Gold $7,500 |
| C | $0 \leq v \leq 660$ | declined | Declined | — | — | — |
|   | $661 \leq v \leq 660$ | approved with offers | Approved A... | Offer Basic | $1,000 | Basic $2,000 |
|   | $701 \leq v \leq 760$ | approved with offers | Approved A... | Offer Basic | $1,500 | Basic $3,000 |
|   | $\leq v \leq 761$ | approved with offers | Approved A... | Offer Basic | $1,500 | Basic $4,000 |
| D | $0 \leq v \leq 720$ | declined | Declined | — | — | — |
|   | $721 \leq v \leq 780$ | approved with offers | Approved A... | Offer Basic | — | Basic $1,500 |
|   | $\leq v \leq 781$ | approved with offers | Approved A... | Offer Basic | $500 | Basic $2,000 |
| E | $0 \leq v \leq 740$ | declined | Declined | — | — | — |
|   | $\leq v \leq 741$ | approved with offers | Approved A... | Offer Basic | Basic $1,000 | — |

Figure 13

APPLICATION PROCESSING AND DECISION SYSTEMS AND PROCESSES

RELATED APPLICATION

This application is the U.S. national phase of International Application No. PCT/US2004/028020 filed on Aug. 27, 2004 which claims the benefit to U.S. Provisional Application No. 60/498,395 entitled "Application processing and decision Systems and Processes," filed on Aug. 27, 2003, which is hereby incorporated by reference.

FIELD OF THE INVENTION

The invention is generally directed to systems and methods for processing information. More particularly, the invention relates to systems and processes for automating tasks related to processing applications such as credit related applications and related decision making.

BACKGROUND

Commercial entities such as financial institutions, commercial entities, retail businesses, health care entities, utilities, and telecoms entities do business to a large extent based on extension of credit. Arranging and establishing home equity loans, installment loans, auto loans, utility accounts, credit card accounts and other relationships with consumers and other commercial entities only occur as a general matter after the creditor has conducted a reasonable level of diligence to ensure that the entity to whom the credit is extended is a reasonable risk. Conventionally, there are a number of credit bureaus and other entities who serve as repositories for credit reporting. Those in the position of extending credit and thus needing to conduct appropriate diligence engage one or more of the credit bureaus or another entity which conducts its own search, typically at least partially manually, of one or more credit bureau's data and other resources. The need for human intervention to conduct the data searches, to draw appropriate inferences based on operative criteria and to report the decision and basis therefore is accordingly time consuming and expensive.

SUMMARY OF THE INVENTION

Various aspects and embodiments of the present invention aim to automate all or a portion of the multi-faceted tasks associated with processing applications and making related decisions based on information from a number of sources and suitable business rules and knowledge. Users of services provided by embodiments of the present invention can include, but are not limited to any entity who aims or needs to make a commercial decision based on commercial, financial and other information. Entities can include, but are not limited to, financial Institutions, commercial institutions, small business commercial lenders, trade credit organizations such as telecoms, retail businesses, insurance companies, brokerages, healthcare institutions, and utilities. Typically, such entities desire to report information such as decision making and/or other information relating to diligence as to certain financial and other issues. The subjects of such diligence can include, but are not limited to, individuals, businesses, and other entities. Such diligence can include, but is not limited to, creditworthiness to qualify for loan, mortgage, or line of credit, including associated conditions including, but not limited to, a type of loan, mortgage, or line of credit, and a monetary amount. Sources of information for such diligence can include, but are not limited to, Equifax, Experian, Trans Union, Dun & Bradstreet, Moody's, Standard & Poor's, and other third-party data providers. Entities can utilize some or all of this information to make decisions whether to offer potential applicants credit or loan products and services. Such entities can ultimately acquire new credit or loan accounts by prescreening potential applicants or otherwise managing their credit or loan portfolios by conducting portfolio review programs, and can therefore select particular clients for their products and services.

For example, in one embodiment, an application processing and decision engine 120 can be implemented for a financial institution such as a bank. A bank can utilize the application processing and decision engine 120 for the processing of a direct deposit account (DDA), credit card, line of credit, home equity line of credit, etc. Information desired by the bank to grant an applicant credit or establish credit worthiness can include, but is not limited to, information about the applicant to establish identity and sufficient information to access credit data from credit reporting agencies, along with data about the applicant (consumer) from other risk analysis commercially available data sources. Other information such as applicant information can include, but is not limited to, applicant's name, current address, social security number, date of birth, previous addresses, co-applicant or spousal information, driver license information, employer information, and income information. For this particular embodiment, potential data sources from which an application processing and decision engine 120 can obtain data to make a decision based upon application and risk factors, among other factors, can include but are not limited to, credit reporting agencies, risk analysis data, check processing services, Kelly's Blue Book, regional consumer exchanges, ChoicePoint, and commercial sources of information such as Dunn & Bradstreet, Moody's, Standard & Poor's, and commercial exchanges.

In some embodiments, a financial institution can desire to make application decisions in an objective manner and to remove human intervention in order to eliminate human errors and minimize possibility of fraud. For these purposes, the automated application processing and decision engine 120 can render a decision using some or all of the following information, as well as other information if desired: information associated with an application, including what the consumer is applying for; information associated with the applicant, including verifiable information about the consumer including identity of the consumer, income; information associated with credit data of the consumer and statistically how it compares to the demographics for the purposes of risk analysis (model scores, attributes, etc.); and information associated with a user-defined method of risk factor calculation (custom attributes). Using such parameters and predefined decision criteria, the automated application processing and decision engine 120 can render an application decision. Types of decisions rendered by an this sort of application can be tailored by the user 112a-n, and can include any or all of the following and any other outcomes desired by the user 112a-n: approved for the product applied for; approved with conditions/limitation (upper limit on credit card, etc.); declined; an automated decision could not be rendered, a manual review is needed; application is approved, however, a manager review is needed; application is not approved for the product applied for, but consumer is qualified for alternate product; and approved for the product/products applied for, consumer also qualifies for additional products/services.

In some embodiments, a financial institution can have certain business rules pertaining to their business intelligence information. In many instances, a business has business intelligence information that is specific to the business or at a minimum, specific to the vertical space the business operates in. A bank, for example, may consider types of banking product a consumer can apply for as business intelligence information. As to this business intelligence information there could be business rules, such as that the bank is in a position to offer a Home Equity Loan only if the consumer also has a Direct Deposit Account with the bank. An automated application processing and decision engine 120 can permit users 112*a-n* to incorporate business intelligence information and business rules into the decision rules applied to applications and other requests for credit.

At a higher level, application processing and decisioning tasks and functionality in accordance with various embodiments of the present invention can be broken down into layers including, but not limited to, a data resource layer, a data analysis layer, a services layer, and a presentation/interface layer.

In brief, when an application for credit, as an example, is being diligenced, entities who use systems and processes according to certain embodiments of the present invention are able automatically to search a number of credit related and commercial databases from a number of sources in a manner that allows the extracted information to be placed in a common format for further processing. The request and the results can be formulated, submitted and delivered on a graphic user interface that is intuitive, configurable and customizable by the user.

At the data analysis layer, analytics, rules and knowledge, which may include criteria and attributes specified and arranged in appropriate sequence by the user 112*a-n* on-line using a graphic user interfaces, are applied to the extracted data. Additionally taken into account in processing the extracted data may be business rules and practices that experientially reflect the practices of the entity extending credit or entities generally of that type such as from an industry template.

The data analysis layer forms inferences and conclusions which can then be further processed and delivered by various components of the services layer. These include couching the information, inferences and/or conclusions appropriately in letters or other communications, performing audits, controlling workflow, allowing trial runs, managing documents reflecting reports of such information, inferences and/or conclusions and other services which may relate to the data, the entity extending credit, the subject of the diligence or other related matters or entities. Such systems and/or processes according to certain embodiments of the invention can "learn as they go" thus keeping track of relevant or successful business rules and their performance and applying or supplying them to other entities or industry areas as circumstances warrant and subject to appropriate controls.

The presentation/interface layer allows the entity extending credit to have greater control over the entire process including online ability to designate data sources, define business rules, define the decision-making rules and sequence, define the format of the information it receives, define the mediums in which the information is received, as well as conduct other types of activities and exert other types of control as may be appropriate.

Accordingly, systems and processes according to various aspects and embodiments according to the invention address at least some or all of these issues and combinations of them. They do so at least in part by automating application processing and decision making. These systems and processes can allow users to apply complex business and decision rules to multiple applications and requests by providing an intuitive GUI (graphical user interface). These systems and processes can allow the user to manage relatively large numbers of applications and requests in an efficient manner. In addition these systems and processes, can access one or more data sources including credit databases to provide desired decisioning calculations in a relatively high performance manner making it suitable for use on relatively large data sets or relatively high volume transaction applications. Such systems and processes are useful in fulfilling user requests for credit data from multiple credit data sources. Systems and processes according to various aspects and embodiments can operate on various operating systems or platforms, including but not limited to, Windows NT®, UNIX®, AIX®, personal computers, mainframes, parallel processing platforms, and supercomputers.

As defined and used within this specification, an "attribute" can include a credit data-related element, a single data element from a credit file, or an aggregation, calculation, or derivation of credit data to form a new data element. Furthermore, a "criteria," also known as "modeling criteria," can include one, two, or more attributes, or a set of attributes, and a set of instructions describing a logical expression involving the attributes therein used to segment or filter credit files to obtain a desired population of data.

One aspect of systems and processes according to various embodiments of the invention, focuses on a method for generating a rule for automated credit request decisioning. The method includes providing a user computer interface adapted to receive information associated with an applicant, and further adapted to display and receive information associated with at least one decision rule. The method also includes receiving information associated with an applicant through the user computer interface; receiving information associated with the applicant from at least one data source; and receiving a selection of information associated with a plurality of decision rules through the user computer interface. Furthermore, the method includes receiving a selection of rule flow information associated with the plurality of decision rules through the user computer interface; generating a plurality of decision rules based at least in part on the information associated with the applicant, based at least in part on the information associated with the applicant from at least one data source, and based at least in part on the selection of information associated with a plurality of decision rules, wherein an outcome associated with at least one of the plurality of decision rules can be obtained; and based in part on at least the rule flow information, displaying at least a portion of the plurality of decision rules through the user computer interface.

Another aspect of systems and processes according to various embodiments of the invention, focuses on a method for testing a decision rule for automated credit request decisioning. The method includes providing a user computer interface adapted to receive information associated with an applicant, and further adapted to display and receive information associated with at least one decision rule. The method also includes receiving test information; receiving information associated with a selection of a decision rule through the user computer interface, wherein the decision rule can be applied to a portion of the test information to obtain an outcome; and applying the selected decision rule to at least a portion of the test information to obtain an outcome. Furthermore, the method includes receiving information associated with a selection of an alternative decision rule, wherein the alternative decision rule can be applied to a portion of the test information to obtain an alternative outcome; applying the alternative rule to at least a portion of the test information to obtain an alternative outcome; and displaying the outcome and the alternative outcome through the user computer interface.

Another aspect of systems and processes according to various embodiments of the invention, focuses on a method for accessing a plurality of data sources for decisioning a credit request associated with an applicant. The method includes providing a user computer interface adapted to transform a portion of information from a plurality of data sources, and further adapted to define at least one rule associated with transforming the portion of information from the plurality of data sources; providing an interface to each of the plurality of data sources; and transforming a portion of data from at least one of the plurality of data sources. The method also includes defining at least one rule associated with making a decision associated with providing credit to an applicant; applying the at least one rule to at least a portion of data from the at least one of the plurality of data sources; and determining an outcome for the at least one rule. Furthermore, the method includes modifying the at least one rule based on the outcome.

Another aspect of an embodiment of the invention includes a system with a user interface and a processor such as an automated application processing and decision engine that can perform some or all of the methods described above.

Another aspect of an embodiment of the invention includes a computer-readable medium that can perform some or all of the methods described above.

These example embodiments are mentioned not to limit or define the invention, but to provide examples of embodiments of the invention to aid understanding thereof. Example embodiments are discussed in the Detailed Description, and further description of the invention is provided there.

Objects, features and advantages of various systems and processes according to various embodiments of the present invention include:

(1) Systems and processes that can provide direct real time application processing control and decision results;

(2) Systems and processes that can provide control of how a decision report is prepared;

(3) Systems and processes that can provide control over access to credit data and related information;

(4) Systems and processes that can provide control over and ability to conduct trialing and/or experimentation with certain models, criteria, attributes or any other variables that relate to requesting or delivery of reports, decisions, diligence, or other information;

(5) Systems and processes that can provide application and decision modularity;

(6) Systems and processes that can provide application and decision reusability;

(7) Systems and processes that can provide flexible and generalized data source access;

(8) Systems and processes that can provide customizable user interfaces;

(9) Systems and processes that can provide user interface-driven business intelligence information gathering;

(10) Systems and processes that can provide a user with the capability to enter near natural language commands to define decision rules;

(11) Systems and processes that can provide graphical review of business processes and other user-specific aspects;

(12) Systems and processes that can provide a user interface driven by data transformation;

(13) Systems and processes that can provide vertical market-specific business and technical components, such as forms, applications, and templates;

(14) Systems and processes that can provide comprehensive strategy implementation for trialing combinations of rules and data sources to determine whether the form and substance of data output is suitable;

(15) Systems and processes that can provide comprehensive delegated security governing access and degree of control over various components of such systems and processes;

(16) Systems and processes that can provide integrated analytics to segment and decision applications, requests, and accounts based on risk and profitability levels and to determine appropriate action; and

(17) Systems and processes that can provide automated business processes for reducing costs and increasing efficiency.

Other objects, features and advantages will become apparent with respect to the remainder of this document.

BRIEF DESCRIPTION OF THE DRAWINGS

These and other features, aspects, and advantages of the present invention are better understood when the following Detailed Description is read with reference to the accompanying drawings, wherein:

FIG. 13 illustrates another example of a user interface for a decision sub-engine in accordance with an embodiment of the invention.

DETAILED DESCRIPTION

Figure 1:
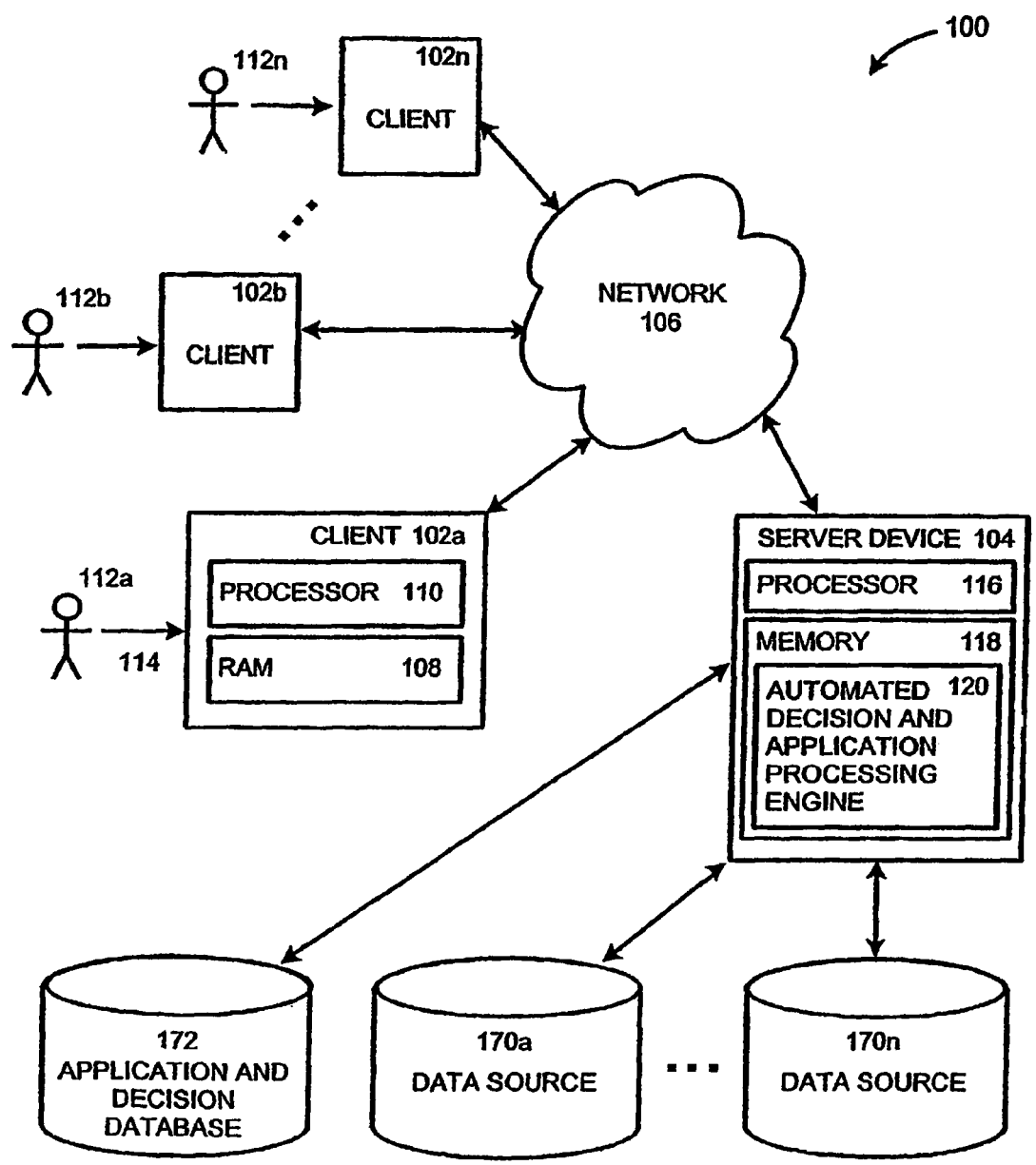
FIG. 1 is an illustration of an example of a system in accordance with an embodiment of the invention.

Referring now to the drawings in which like numerals indicate like elements throughout the several figures, FIG. 1 is an illustration of example system components for a system in accordance with an embodiment of this invention. The system 100 shown in FIG. 1 comprises multiple client devices 102a-n in communication with a server device 104 over a network 106. The network 106 shown comprises the Internet. In other embodiments, other networks, wired and wireless, such as an intranet, local area network, wide area network, or broadcast network may be used. Moreover, methods according to the present invention may operate within a single client or server device.

Each client device 102a-n shown in FIG. 1 preferably comprises a computer-readable medium. The computer-readable medium shown comprises a random access memory (RAM) 108 coupled to a processor 110. The processor 110 executes computer-executable program instructions stored in memory 108. Such processors may comprise a microprocessor, an Application-Specific Integrated Circuit (ASIC), a state machine, or other processor. Such processors comprise, or may be in communication with, media, for example computer-readable media, which stores instructions that, when executed by the processor, cause the processor to perform the steps described herein.

Embodiments of computer-readable media may comprise an electronic, optical, magnetic, or other storage or transmission device capable of providing a processor, such as the processor 110 of client 102a, with computer-readable instructions. Other examples of suitable media may comprise a floppy disk, Compact Disk Read Only Memory (CD-ROM), magnetic disk, memory chip, Read Only Memory (ROM), Random Access Memory (RAM), an ASIC, a configured processor, all optical media, all magnetic tape or other magnetic media, or any other suitable medium from which a computer processor can read instructions or on which instructions, code, or other data may be stored. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n may also comprise a number of external or internal devices such as a mouse, a CD-ROM, a keyboard, a display, or other input or output devices. Examples of client devices 102a-n are personal computers, media center computers, televisions, television set-top boxes, digital assistants, personal digital assistants, cellular phones, mobile phones, smart phones, pagers, digital tablets, laptop computers, Internet appliances, and other processor-based devices. In general, a client device 102a-n may be any type of processor-based platform that may be connected to a network 106 and that interacts with one or more application programs. Client devices 102a-n may operate on any operating system, such as Microsoft® Windows® or Linux, capable of supporting one or more client application programs. For example, the client device 102a shown comprises a personal computer executing client application programs, also known as client applications. The client applications can be contained in memory 108 and can comprise, for example, a media player application, a presentation application, an Internet browser application, a calendar/organizer application, and any other application or computer program capable of being executed by a client device.

Through the client devices 102a-n, users 112a-n can communicate over the network 106 with each other and with other systems and devices coupled to the network 106. As shown in FIG. 1, a server device 104 is also coupled to the network 106. For example in the embodiment shown in FIG. 1, a user 112a can operate a client 102a and to interact with the server device 104 and formulate a request for a particular set of credit data. The client 102a sends a signal corresponding to the request via the network 106 to the server 104.

The server device 104 shown in FIG. 1 comprises a server executing at least one automated application processing and decision program, also known as the automated application processing and decision engine 120. Similar to the client devices 102a-n, the server device 104 shown in FIG. 1 comprises a processor 116 coupled to a computer-readable memory 118. Server device 104, depicted in FIG. 1 as a single computer system, may be implemented as a network of computer processors. Examples of a server device are servers, mainframe computers, networked computers, a processor-based device, and similar types of systems and devices. Client processors 110 and the server processor 116 can be any of a number of well known computer processors, such as processors from Intel Corporation of Santa Clara, Calif. and Motorola Corporation of Schaumburg, Ill.

Memory 118 on the server device 104 contains the automated application processing and decision engine 120. An automated application processing and decision engine 120 comprises a software or hardware application that is configured to automatically process credit applications and to render a decision regarding such applications. In response to a request from a user 112a-n, the automated application processing and decision engine 120 shown in FIG. 1 can process a credit application, form, or request from a user 112a-n, and access information in one or more credit data sources 170a-n, such as a credit reporting database containing a suitable runtime component or runtime environment component. Credit applications, forms, and requests can be associated with an applicant or set of applicants also referred to respectively as "customer" or "customers," "customer entity" or "customer entities," and/or "consumer" or "consumer entities") In one embodiment, the automated application processing and decision engine 120 can utilize information from at least one credit data source 170a-n, such as a credit data source, and apply one or more predefined rules to make a decision regarding a credit application associated with a particular applicant.

An application and decision database 172 or another suitable data storage device such as a memory device, hard drive, database, or other storage medium can be in communication with the automated application processing and decision engine 120. In one embodiment, the application sub-engine 200 can store an application, associated application information, and a new application ID or application identification code in the application and decision database 172. In another embodiment, the decision sub-engine 202 can store a decision and decision information in the application and decision database 172. In these and other embodiments, the automated application processing and decision engine 120 can retrieve stored applications, information, new application IDs or application identification codes, decisions, and decision information from the application and decision database 172 as needed.

Although the processes described herein are described in relation to the client and server or servers, a client may perform any or all of the processes described as being performed by a server. Similarly, a server or servers may perform any or all of the processes described herein as being performed by a client, although the invention is not limited to client/server architecture but can run on any desired topology or architecture as deemed fit for the purposes, whether existing as of the time of the writing of this document or thereafter.

Embodiments of the present invention can comprise systems having different architecture than that which is shown in FIG. 1. For example, in some systems according to the present invention, server device 104 may comprise a single physical or logical server. The system 100 shown in FIG. 1 is merely an example, and is used as an environment to help explain the example processes and methods shown in FIGS. 14-24.

Figure 2:
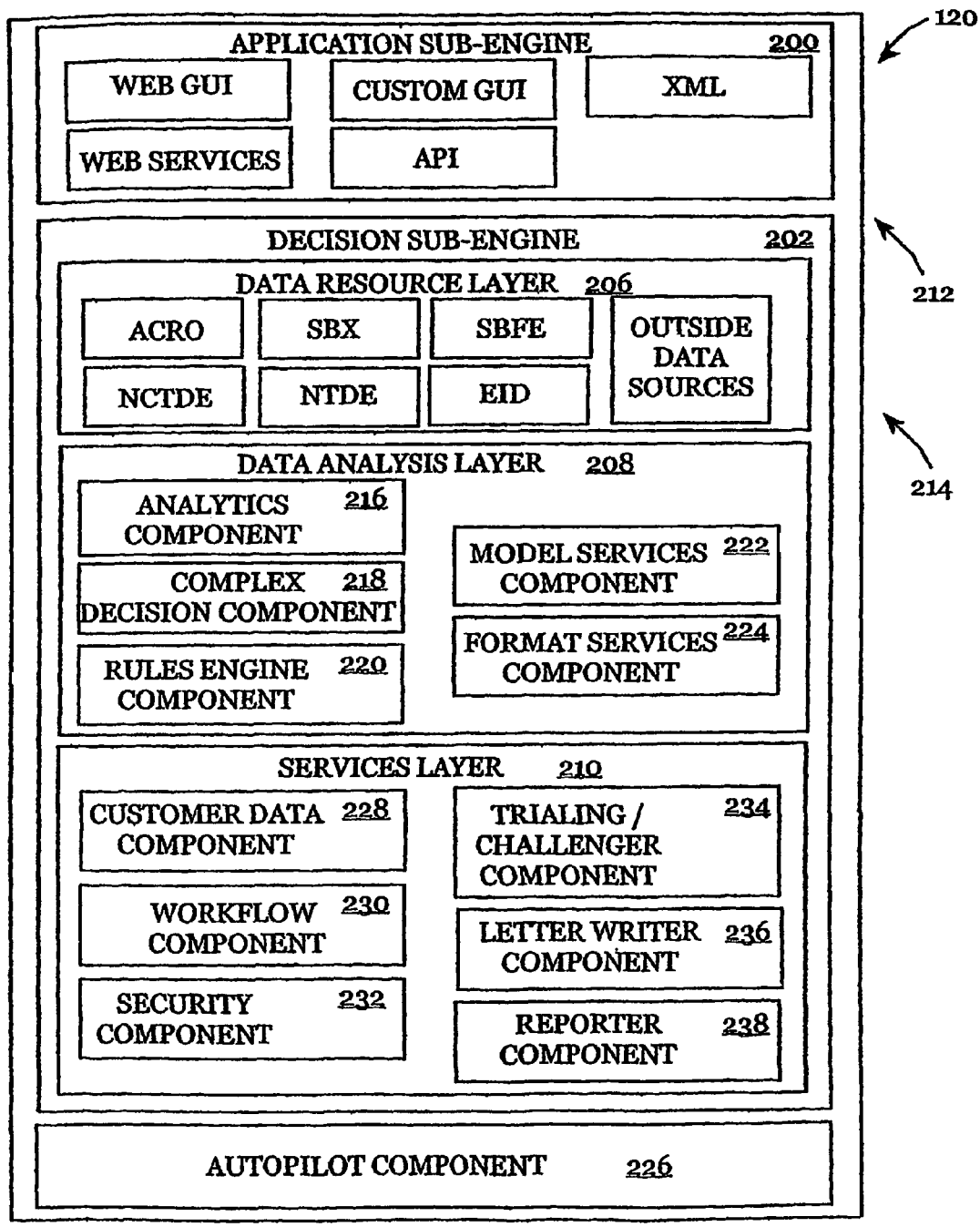
FIG. 2 is an illustration of certain components for an automated application processing and decision engine for a system in accordance with an embodiment of the invention.

As shown in FIG. 2, an example automated application processing and decision engine 120 can include, but is not limited to, an application sub-engine 200, and a decision sub-engine 202. The application sub-engine can include, but is not limited to, a presentation/interface layer 204. The decision sub-engine 202 can include, but is not limited to, a data resource layer 206, a data analysis layer 208, and a services layer 210. Other engines, sub-engines, components, sub-components, layers, or modules for an automated application processing and decision engine 120 can exist. Collectively, the components of the automated application processing and decision engine 120 can support the automation of the credit decision, loan-origination, and account-acquisition lifecycle, including application processing, the acquisition of data, and decisioning. In addition, the automated application processing and decision engine 120 can include other components to achieve even greater automation, control and process efficiencies for users. The processing of applications, acquisition of data, and decisioning are central to credit-granting entities of the United States and other countries, and the automated application processing and decision engine 120 mitigates risk, and increases efficiency through the conservation of time and expenses.

The embodiment described in FIG. 2 is one example of an automated application processing and decision engine 120. Other engines, sub-engines, components, sub-components, layers, and modules, can operate in conjunction with or can otherwise be integrated with an automated application processing and decision engine 120 shown in FIG. 2.

Application Sub-Engine

In the embodiment shown in FIG. 2, the automated application processing and decision engine 120 can include, but is not limited to, an application sub-engine 200. The application sub-engine 200 can manage applicant data from a point-of-entry through decision and booking. Various methods of applicant evaluation and workflow management, including reduction of re-keying applicant data, automatically redirecting inquiries into an appropriate worklist, and prioritizing workflow can save users significant time and expense. This component can operate in tandem with call center, letter-writing, and/or billing-type applications and systems. The application sub-engine 200 can improve quality of the account origination process such as simplifying and streamlining the account acquisition process, eliminating re-keying of application data, automatically redirecting inquiries into an appropriate worklist. Previously disjointed, modular systems can now be integrated, reducing time frames and expenses throughout the process, while increasing the volume and quality of automated application handling.

Figure 3:
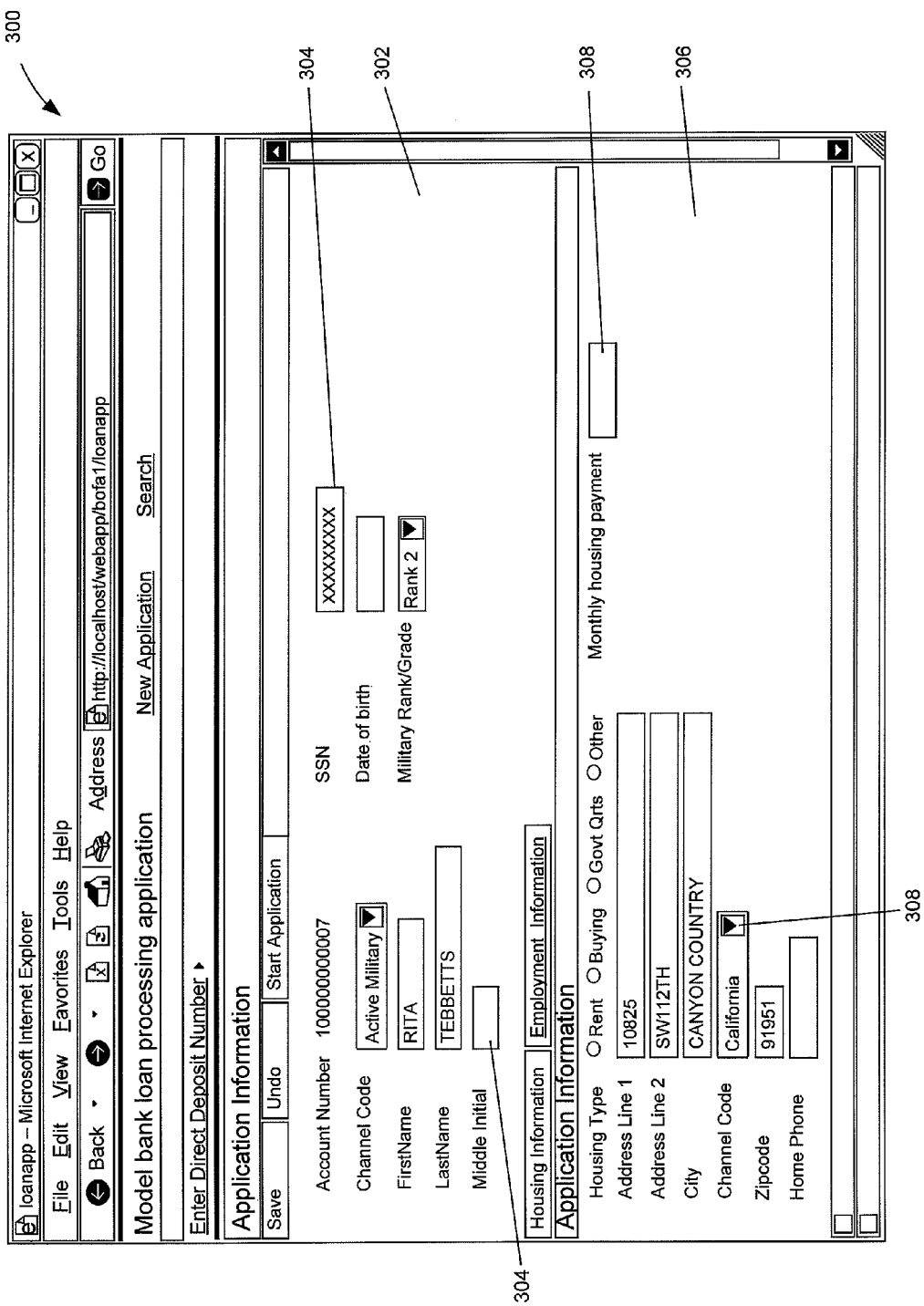
FIG. 3 illustrates an example of a user interface for an application sub-engine in accordance with an embodiment of the invention.

In one embodiment, a user interface such as an application form 300 in FIG. 3 can be displayed by an application sub-engine 200 via an output device associated with a client 102a-n. The application form 300 can prompt a user 112a-n to enter information such as applicant data, and the application form can collect the data for subsequent processing by the application sub-engine 200. A user 112a-n operating a keyboard, mouse, and/or another input device associated with a client 102a-n can enter information into the application form 300.

In the example shown in FIG. 3, the application form can be used to collect information about an applicant for a bank loan. An upper portion 302 of the application form 300 provides data entry devices 304 for entry of applicant data or associated information such as channel code, first name, last name, middle initial, social security number (SSN), date of birth, and military rank/grade. Data entry devices 304 can include, but are not limited to, pull-down menus, data fields, radio buttons, and other devices to prompt and to collect and prompt information. A lower portion 306 of the application form 300 provides one or more data entry devices 308 for entry of housing-type information such as housing type, address, city, state, zip code, home telephone number, and monthly housing payment. Other types of information including applicant data can be collected with various application forms, templates, webpages, or other types of data input devices, and subsequently used by the application sub-engine 200.

In one embodiment, an application sub-engine 200 for an application processing and decision engine 120 can also be utilized for a commercial application. A predefined template, or other user interface similar to the application form 300 shown in FIG. 3, can be employed to receive information from a user 112a-n about a particular business. Business application decisioning can be achieved in generally the same manner as for individuals, and employ one or more data sources such as, but not limited to, Dunn & Bradstreet, Moody's, S&P, Experian Small Business, Equifax Small Business Exchange, Equifax Small Business Financial Exchange, and/or others' credit worthiness—related information for commercial business entities.

Presentation/Interface Layer

The application sub-engine 200 can include, but is not limited to, a presentation/interface layer 204. In the example shown in FIG. 2, the presentation/interface layer 204 can provide functionality for configuring user-defined prompts, data fields, drop down menus, screen flows and work items pertinent to a particular user's industry and specific business environment that enable efficient processing and review of applicant data. As shown in the example of FIG. 2, a presentation/interface layer 204 can include one or more interfaces such as a graphical user interface (GUI), web GUI, custom GUI, extensible markup language (XML), web services, and application program interfaces (API). Such interfaces for the presentation/interface layer 204 can operate individually or in an integrated fashion to provide a front-end user interface for interaction between the automated application processing and decision engine 120 and a user 112a-n operating a respective client device 102a-n. According to a preferred embodiment, the presentation/interface layer 204 can utilize software such as Transaction Logic Engine™ distributed by Versata, Inc. in a conventional manner. In another embodiment, JAVA programming code and graphical user interfaces can be utilized to provide a suitable user interface environment for a presentation/interface layer 204.

The screenshot illustrated in FIG. 3 shows an example user interface generated by software such as the Transaction Logic Engine™ software distributed by Versata, Inc. Connectivity of systems and processes according to certain embodiments of the invention with other entities and process can take any desired form, including the application form 300 shown in FIG. 3.

In one embodiment, the presentation/interface layer 204 can capture a particular user's 112a-n user interface requirements and evaluate which features that deviate from a standard, default setting and would require some custom coding effort. The presentation/interface layer 204 can accommodate most special requests. Some of the common options handled by the presentation/interface layer 204 include the following features: screen dimensions, user branding requirements, cascading style sheets, and user interface page headings.

In one embodiment, a presentation/interface layer 204 can generate templates or can otherwise utilize predefined templates for particular categories of businesses. Categories of businesses that can be the subject of templates typically reflect general aspects of businesses in a category. Templates can incorporate fundamental items relevant to a given category, including but not limited to, core functions, core rules, core regulations, core data sources, and core partners. Templates can also add to such information as a particular template is used or as businesses in the particular category use the systems and processes.

Figure 14:
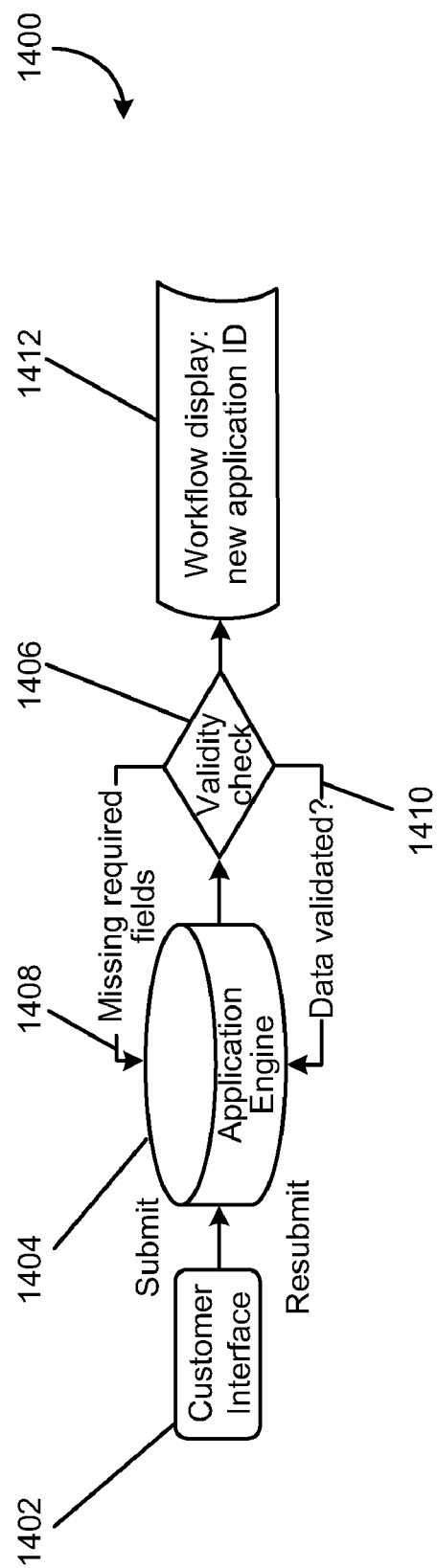
FIGS. 14-21 illustrate example processes for an application processing and decision engine in accordance with an embodiment of the invention.
Figure 15:
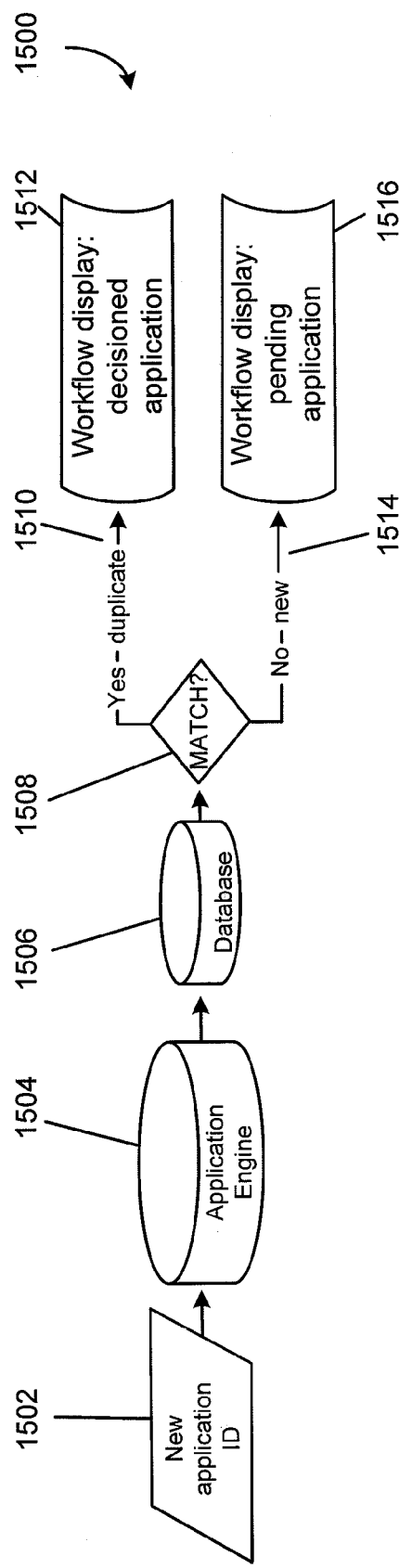

For example, in the case of a user 112a-n such as a financial institution, the financial institution can utilize the presentation/interface layer 204 to enter information to obtain a credit decision for a particular applicant or set of applicants interested in a direct deposit account (DDA). Utilizing the presentation/interface layer 204, the financial institution can interface with the automated application processing and decision engine 120 to use various templates and other components to obtain a solution such as a credit decision. At a very high level, one embodiment of such a solution includes a template for an application for DDA. The presentation/interface layer 204 can provide a front-end user interface such as a predefined application to accept information from a user 112a-n such as a financial institution. In this example, information about one or more applicants interested in opening a DDA can be input by the user 112a-n into an application displayed on an output device associated with a client 102a-n. Examples of processes that can be implemented by a presentation/interface layer 204 are shown in FIGS. 14 and 15.

The presentation/interface layer 204 can also extract credit information about a particular applicant from one or more data sources 170a-n such as a credit reporting agency (CRA). The presentation/interface layer 204 can interact with other layers or components of the automated application processing and decision engine 120 to build analytical models based upon the information contained in the credit report of the applicant. Such analytical models can then be displayed for presentation and analysis to the user 112a-n by the presentation/interface layer 204. The automated application processing and decision engine 120 can then provide the presentation/interface layer 204 with decision information such as a decision as to what can be approved based upon the credit history and analytical model of the applicant. In turn, the presentation/interface layer 204 can display the decision information to the user 112a-n.

In one embodiment, the presentation/interface layer 204 can provide a front-end interface for users 112a-n desiring business process modeling. For example, the presentation/interface layer 204 can display a template for a predefined business process model of opening a DDA account including multiple process steps/people within a particular type of financial institution.

Decision Sub-Engine

Figure 16:
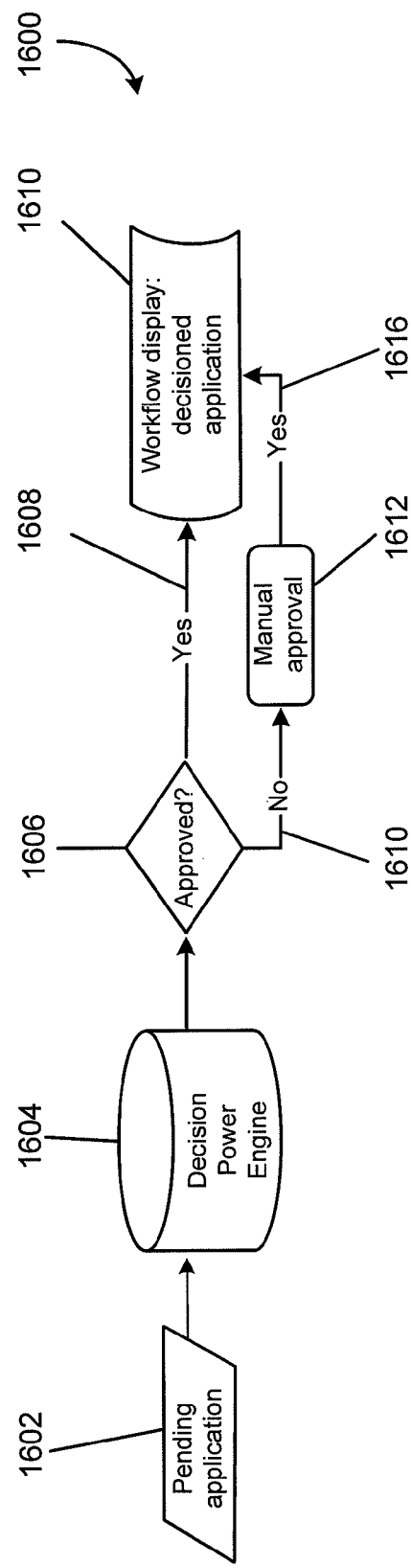
Figure 17:
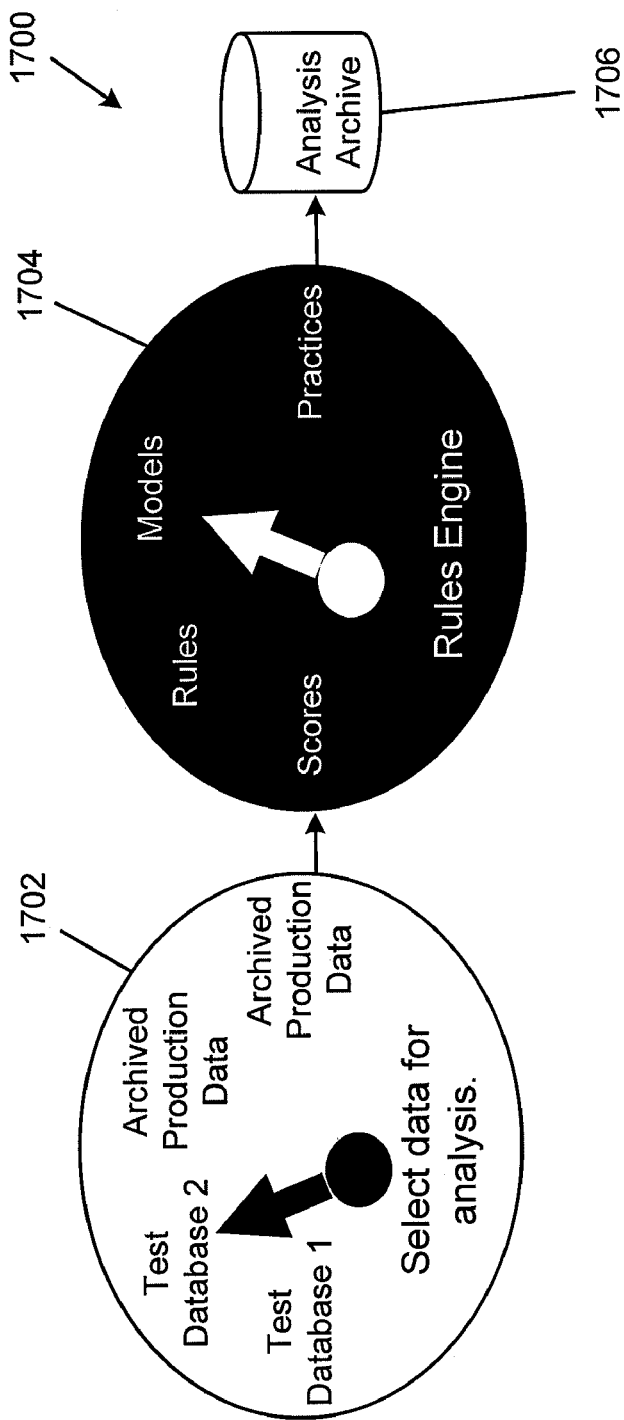

In the embodiment shown in FIG. 2, the automated application processing and decision engine 120 can include, but is not limited to, a decision sub-engine 202. The decision sub-engine 202 can interact with the application sub-engine 200 to provide a customizable, point-of-presence solution uniquely capable of incorporating risk and marketing models, fraud and identity verification tools, third-party data sources, user-owned client intelligence and credit databases. The decision sub-engine 202 can incorporate a variety of risk assessment tools and data sources into an automated decisioning process, which can facilitate risk and marketing decisions made across various industries. An example of processes implemented by a decision sub-engine 202 are illustrated in FIGS. 16 and 17.

The decision sub-engine 202 can integrate analytics to segment and decision applications or accounts stored in a data source 170a-n based on risk and profitability levels, thus saving time in the decision-making process and providing consistency across units.

Figure 4:
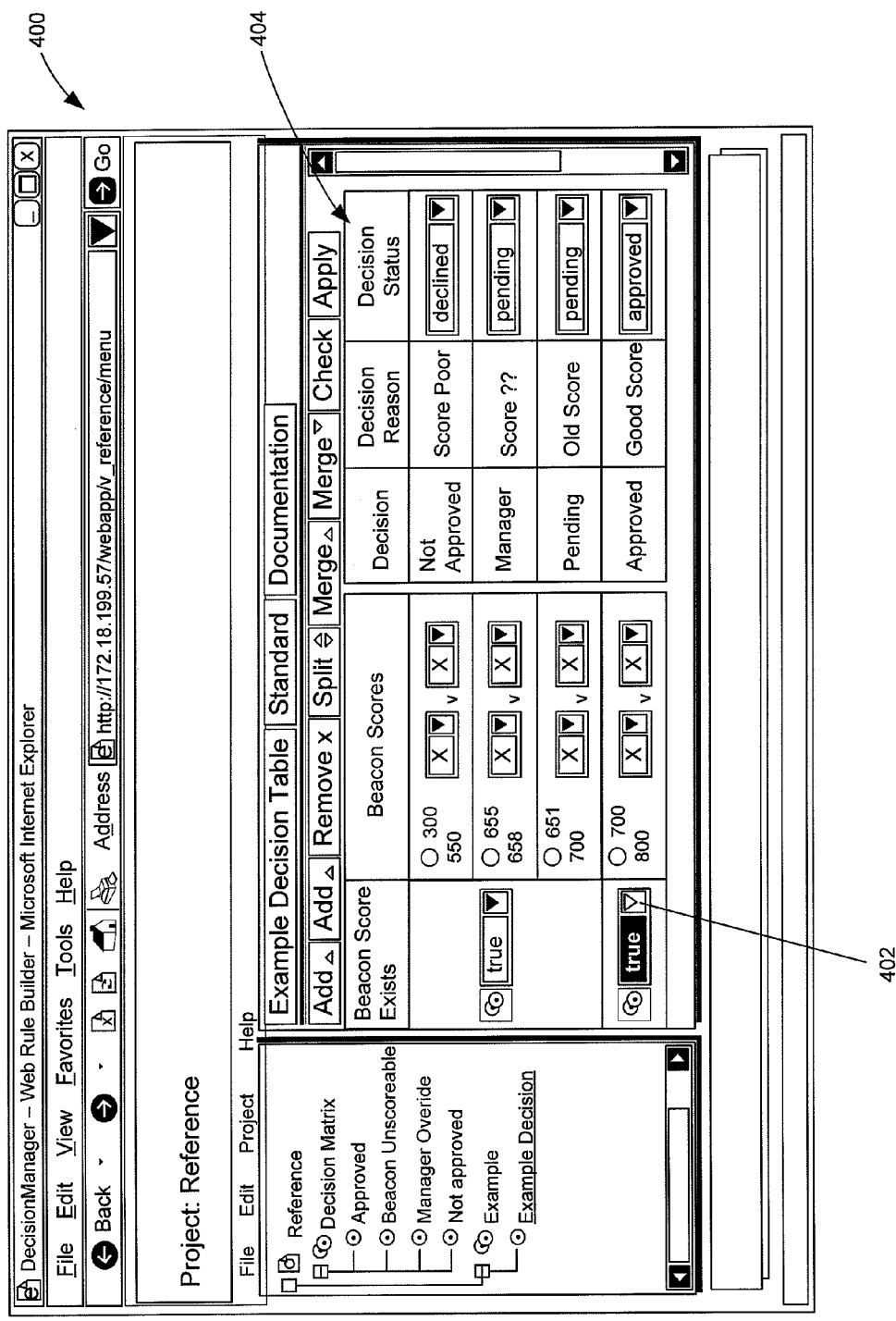
FIG. 4 illustrates an example of a user interface for a decision sub-engine in accordance with an embodiment of the invention.

In one embodiment, a user interface such as a rule display form 400 in FIG. 4 can be displayed by the decision sub-engine 202 via an output device associated with a client 102a-n. The rule display form 400 can assist a user 112a-n in creating and developing rules for the decision sub-engine 202 to apply to applicant data collected by the application sub-engine 200. In the example shown, the rule display form 400 can provide a decision table matrix including various rule input devices 402 and decision information 404. Rule input devices can include, but are not limited to, radio buttons, pull-down menus and data fields. Decision information can include, but is not limited to, existence of a Beacon™ score, Beacon™ score ranges, a decision, decision reason, and decision status.

Data Resource Layer

The decision sub-engine 202 can include, but is not limited to, a data resource layer 206. The data resource layer 206 can provide integration and archival capabilities for all relevant applicant and credit data in a suitable format that can be user-friendly and easily searched. Such data can also be stored by the data resource layer 206 for subsequent retrieval, analysis, and reporting. The data resource layer 206 can also allow such data to remain accessible by any suitable platform or operating system a particular user 112a-n supports, such as platforms and operating systems operated by internal, external, third party, and legacy data sources and service providers. Users 112a-n, and applicants can benefit from real time and/or immediate access to recent credit files and other records, coupled with quick retrieval of data archived in compliance with regulatory timeframes. The data resource layer 206 can also accommodate varying data input and data output formats required when integrating with multiple data sources and third party service providers; thus, providing a suitable format for data storage that can be user-friendly and searched relatively easily. Such data can also be stored in a data storage device such as a data source 170a-n or an application and decision database 172. In this manner, users 112a-n and their customers can obtain immediate access to recent records and quick retrieval of data. The data resource layer 206 can include functionality that allows other components of the automated application processing and decision engine 120 to access and draw from a plurality of data sources 170a-n, and cause the data to be converted into form and format, which may be common, for further processing. The data sources 170*a-n* can be internal or external or both.

The data resource layer 206 operates with the sub-engines 200, 202, and other layers 204, 208, 210 to provide prepackaged access, format and error handling to access data from internal and external data sources. In the example shown in FIG. 2, the data resource layer 206 can include respective interfaces 214 with the data sources 170*a-n* shown in FIG. 1. Such interfaces with data sources can include, but are not limited to, particular interfaces with internal data sources such as Equifax Consumer US (ACRO), Equifax Consumer Canada, Equifax Telco Exchanges (NTDE, NCTDE), Equifax Commercial Exchanges (SBFE, SBX), Equifax eIDverifier and eIDcompare (eID), and interfaces with external or outside data sources such as Experian Consumer, Experian Small Business, Telecheck, TransUnion (TU), Dun & Bradstreet, Moody's NACM, RiskWise, Standard & Poor's, CDC, Certegy, Quova, TCI, and TSYS.

In one embodiment, the data resource layer 206 can operate as an abstraction layer to provide user/business profile data from generic or specific data resources, such as consumer and/or commercial sources. Together, the data resource layer 206 and other components together can provide a solution for a user 112*a-n* where data needs to be obtained or otherwise retrieved from various data sources to facilitate application decision in context of the business value of the user 112*a-n*.

One aspect of this particular component 206 is that its abstract nature can make application processing data source agnostic, and can enable provision of application decision solutions using any or multiple data sources without need for custom coding efforts to obtain or retrieve data from data sources for each user solution. In one embodiment, a data resource layer 206 can accommodate varying data input and data output formats when integrating multiple data sources and third party service providers. The data resource layer 206 can automatically extract, transform, and load heterogeneous data fields from the one or more data sources 170*a-n*, minimizing or otherwise reducing the need for custom coded processing of such data.

According to a preferred embodiment, the data resource layer 206 can utilize a data transformation third-party tool such as eGate™ distributed by SeeBeyond.

Data Analysis Layer

The decision sub-engine 202 can also include, but is not limited to, a data analysis layer 208. The data analysis layer 208 can include, but is not limited to, an analytics services component 216, a complex decision component 218, a rules engine component 220, a model services component 222, a format services component 224. The data analysis layer 208 can form inferences and conclusions which can be further processed and delivered by various components of the data services layer 210.

a. Analytics Services Component

The analytics services component 216 can utilize the data provided by the data resource layer 206 and can process the data to provide analytics on the data. Generally, a result of an analysis of such data is the creation of one or more attributes. For example, attributes can be "Number of open bankcard trades on file with a balance greater than zero," "Age of oldest trade on file," "Aggregate balance of all open revolving accounts," "Number of 30 day and greater current delinquent ratings," "Propensity to buy information from user master files," "Psychographic codes like P$ycle," and "Marketing models based on non-credit related data." In this manner, the results of such analytics can be utilized in such a way that the results can be further analyzed or otherwise used by other components or services of the automated application processing and decision engine 120. Additionally, provisioning results of the analytics (such as attributes and criteria) minimizes data processing by other components or services, which would otherwise face relatively greater inefficiencies in parsing data and calculating attributes as part of their own processing.

One aspect of this particular layer 208 is that it can enable any suitable type of simple or complex statistical analysis to be performed on data, such as raw data from a data source 170*a-n*, prior to the usage of the data for a decision regarding a particular application.

In one embodiment, a user 112*a-n* such as a financial institution risk manager or others can utilize an analytics services component 216 of an automated application processing and decision engine 120 to define methods of automated decisioning to minimize risk. At the same time such methods can maximize the revenue potential, by not incorrectly rejecting applications that are within required risk parameters for a particular business. For purposes of automated decisioning based upon the credit data available for a particular customer of a user 112*a-n*, users 112*a-n* can define one or more attributes. These attributes can be generated by, for example, using the data contained in a credit report associated with a particular applicant or set of applicants. These attributes can represent statistical aggregation and/or other various data elements. For example, an attribute can be a calculation of total number of new trade lines in last 2 years present in the credit report. This summation (statistical function) can be considered a proxy for how aggressive the applicant has been in establishing new lines of credit lately, whether that fact presents an unacceptable risk, or whether the risk is acceptable because it is an indication that the applicant's financial situation may be improving.

In one embodiment, criteria and attributes can be intuitively defined, and the associated analytics may be accommodated with an automated criteria and attribute application engine such as an Autopilot component, shown as 226 in FIG. 2, and further described in U.S. application Ser. No. 10/868,476, filed Jun. 14, 2004, entitled "SYSTEMS AND PROCESSES FOR AUTOMATED CRITERIA AND ATTRIBUTE GENERATION, SEARCHING, AUDITING AND REPORTING OF DATA," the contents of which are incorporated herein by reference. The Autopilot component 226 can be integrated with an automated application processing and decision engine 120 or can be a separate component in communication with the automated application processing and decision engine 120. The Autopilot component 226 can help reduce the burdensome and error-prone task of interpreting user specifications for a project manually into job control language. It can help those users 112*a-n* charged with development of the query or search algorithms and language think and act at a more intuitive and higher level, as they can focus more on the information being sought and how it will be presented, and less about actually instantiating these ideas into computer-executable instructions or code such as a job control code or job control language.

The Autopilot component 226 can also accomplish tasks such as improving the process flow and general cycle time of various processes. Often the client-requested criteria requires programming support to adjust, modify, enhance or extend existing selection criteria modules (record selection processes) to meet the specific client request. Some requests require programming to implement complete new modules.

Creating these jobs and running them through the testing/validation cycles can be a lengthy process. All of the activities have been both time and system resource consuming as changes are made and iteratively tested.

Toward improving this situation, an Autopilot component 226 can provide a workstation environment for the specification and testing of criteria and attributes on which the criteria is based. Resultant criteria and attributes can be utilized in a relatively high performance module that can be executed on multiple platforms and operating systems, such as personal computers, mainframes, parallel processing platforms, and supercomputers.

The Autopilot component 226, similar to a programming integrated development environment such as Visual C++ for a programmer, can provide relatively easy to use point-and-click capability to enable a user 112a-n to generate and process a custom request for criteria and/or attributes. In one embodiment, such criteria and attributes can be utilized for generating a prescreening list to filter data from one or more data sources such as 170a-n.

In one example, an Autopilot component 226 can provide a mechanism for a user 112a-n such as a credit provider or financial institution to specify custom criteria and attributes. Such criteria and attributes can then be utilized by the decision sub-engine 202 to automate a decisioning process. An example of custom criteria and attributes is a calculation of information, such as how many trade lines a particular applicant has where the amount due is over $1000, over due by 30 days from the past due date in last 6 months, and/or where trade lines were established (i.e. the credit line established) in the last 2 years. The attributes and criteria in this example can then be used as part of a decision process where a user 112a-n such as a credit provider or financial institution may be inclined to offer only a restricted service to the applicant if this particular attribute is greater than a value of 5, representing a relatively higher degree of risk, as assessed by a risk manager associated with the financial institution.

Figure 22:
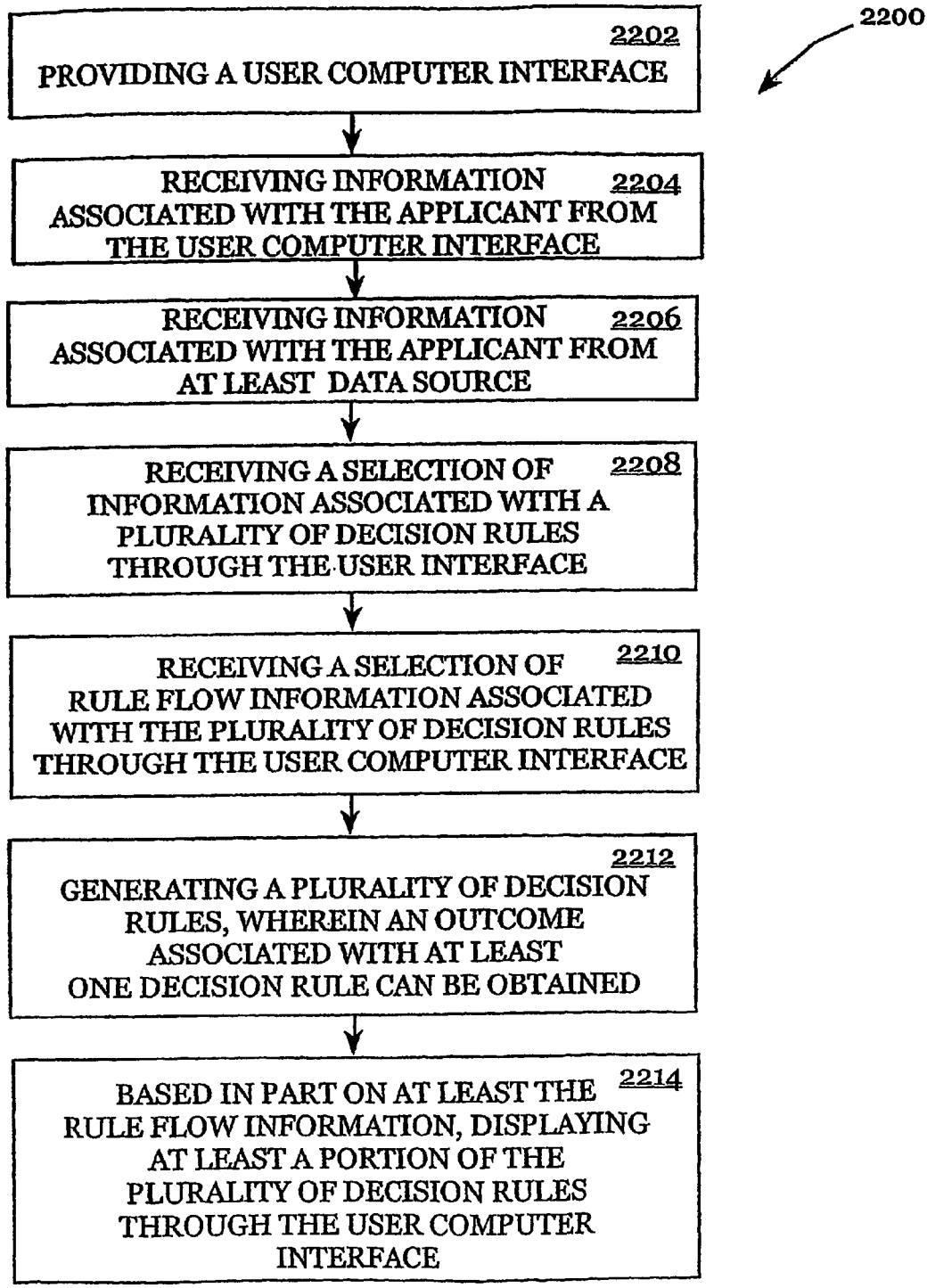
FIGS. 22-24 illustrate example methods for an application processing and decision engine in accordance with an embodiment of the invention.

Examples of a decisioning process are shown in FIGS. 16, 17, and 22.

By way of further example, the above criteria and attributes can be applied to the Direct Deposit Account (DDA) example introduced above. The following example is an attribute defined using an Autopilot component 226:

Calculate Number of instances in which a Bankruptcy occurs (Chapter 7/11/13) in last 2 years from current date and provide bankruptcy disposition type based upon following maps:

1=Filed if Disposition Code is C or D
2=Discharged if Disposition Code is A, F or L
3=Dismissed if Disposition Code is E, K or M
4=Voluntary if Disposition Code is V
5=Involuntary if Disposition Code is I
6=Non-Adjudicated if Disposition Code is N
7=Unknown If Tradelines contain narrative code of BW, EV, HM, HN, IA or IL then do not report bankruptcy.

In one embodiment, attributes can also be defined taking into account the way a particular user 112a-n such as a financial institution does business, such as by using one or more predefined business templates. Other attributes and criteria can be defined taking into account aspects of a particular business, industry, or customers of the user 112a-n. These and other attributes and criteria can be part of one or more predefined templates available to a user 112a-n.

b. Complex Decision Component

The data analysis layer 208 can also include, but is not limited to, a complex decision component 218. The complex decision component 218 can utilize the data provided by the data resource layer 206, analytics provided by the analytics services component 216, application parameters and decision rules set for a user specific application processing in order, among other things, to render an automated application decision. The complex decision component 218 can be particularly valuable and powerful because it can allow definition of application decision rules in near natural language constructs while simplifying the process of defining decision rules for use by an automated application processing and decision 120. One aspect of the complex decision component 218 is the manner in which data from one or more data sources 170a-n can be made available the decision sub-engine 202 to define decision rules. Various sets of attributes can also be made available for some or all data sources 170a-n in a standard way when the decision rules are created.

According to a preferred embodiment, a complex decision component 218 can utilize suitable software such as JRules™ distributed by ILOG, Inc. In another embodiment, a complex decision component 218 can utilize JRules™ for service delivery coupled with one or more interfaces (standard or customized) to one or more data sources 170a-n.

Figure 5:
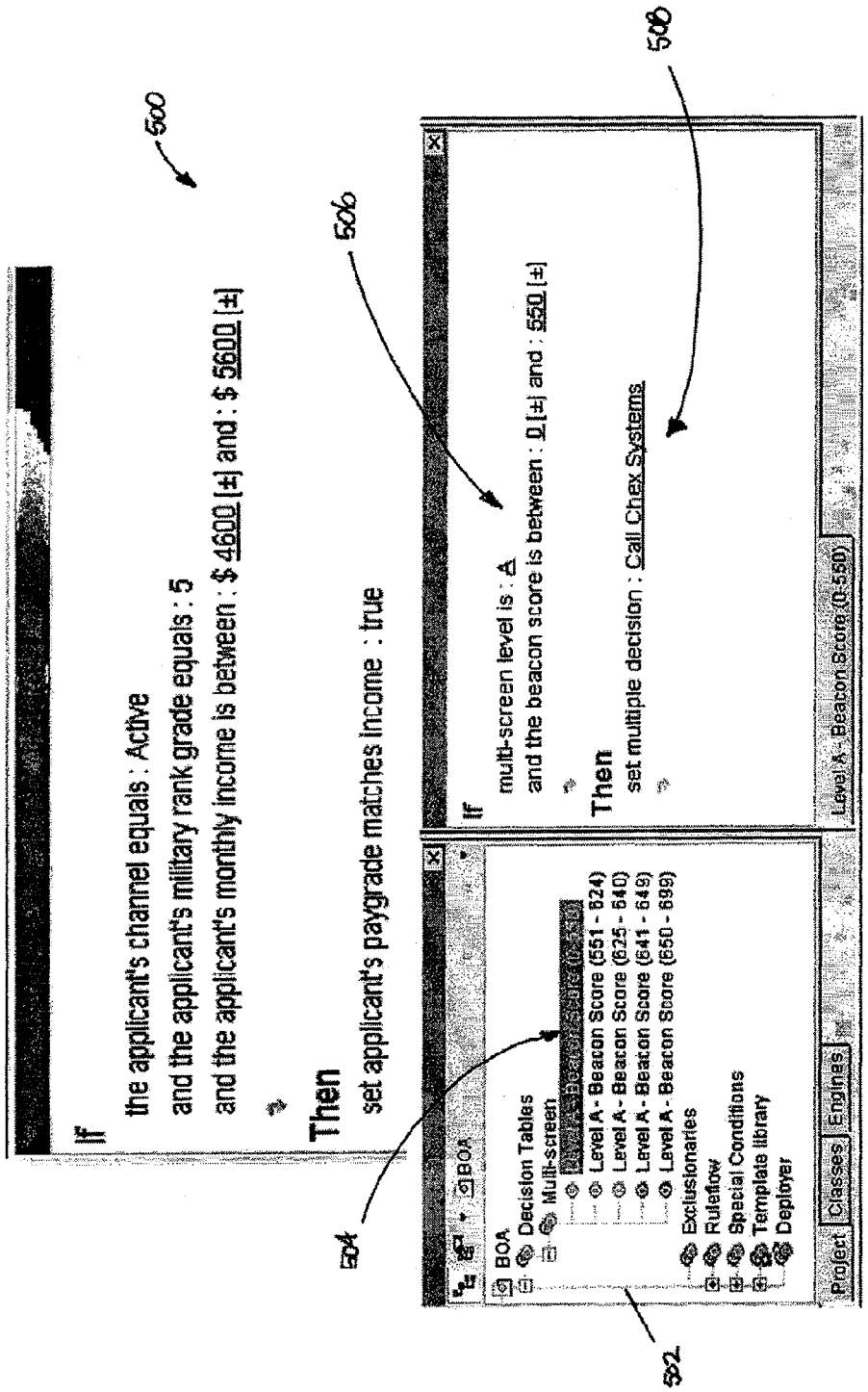
FIG. 5 illustrates another example of a user interface for a decision sub-engine in accordance with an embodiment of the invention.

FIG. 5 shows an example of a user interface 500 associated with a complex decision component 218. In this example, a user 112a-n can operate an input device such as a keyboard, mouse, or other input device associated with a client 102a-n to enter or otherwise select information to generate one or more decision rules such as "if" statements 502 and corresponding "then" statements 504. For example, a user 112a-n can set particular conditions and select desired criteria and/or attributes for a particular business or decision rule concerning an applicant with a Beacon™ score between the values of 0 and 550. The user interface 500 shown includes a tree-type menu 502 for a user 112a-n to select various decision rule-type information 504 such as decision tables, exclusionary rules, rule flows, special conditions, template libraries, and a deployer. An "if" statement 506 illustrated in the user interface 500 shown includes "if multi-screen level is 'A' and the Beacon™ score is between 0 and 550." A corresponding "then" statement 508 illustrated in the user interface 500 includes "'then' set multiple decision 'Call Chex Systems.'" Collectively, the "if" statement 506 and "then" statement 508 create a decision rule for the complex decision component 218 to apply to either or both applicant data and data from one or more data sources 170a-n. The example user interface 500 shown in FIG. 5 can be utilized to develop the decision rule shown with suitable software such as JRule Builder™ distributed by ILOG, Inc.

Figure 6:
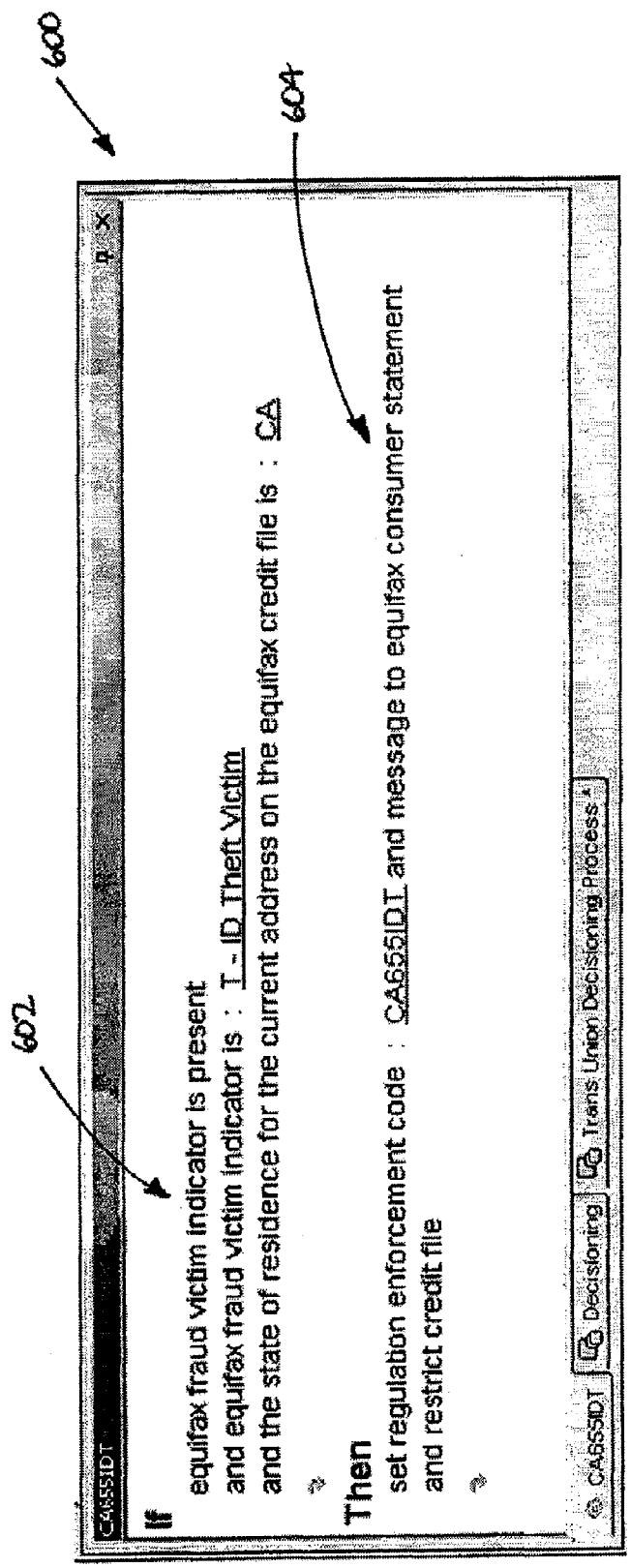
FIG. 6 illustrates another example of a user interface for a decision sub-engine in accordance with an embodiment of the invention.

FIG. 6 also illustrates a user interface 600 associated with a complex decision component 218. In this example, a user 112a-n can operate an input device such as a keyboard, mouse, or other input device associated with a client 102a-n to generate application decision rules in near natural language constructs such as "if" statements 602 and corresponding "then" statements 604. For example, a user 112a-n can set particular conditions and select desired criteria and/or attributes for a particular set of applicants who were previously credit fraud victims in California. The user interface 600 shown includes "If" statements 602 such as "If . . . equifax fraud victim is present," "and Equifax fraud victim indicator is: T-ID Theft Victim," "and the state of residence for the current address on the Equifax credit file is: CA." Corresponding "Then" statements 604 shown include "Then . . . set regulation enforcement code: CA655IDT and message to Equifax consumer statement," "and restrict credit file."

Figure 7:
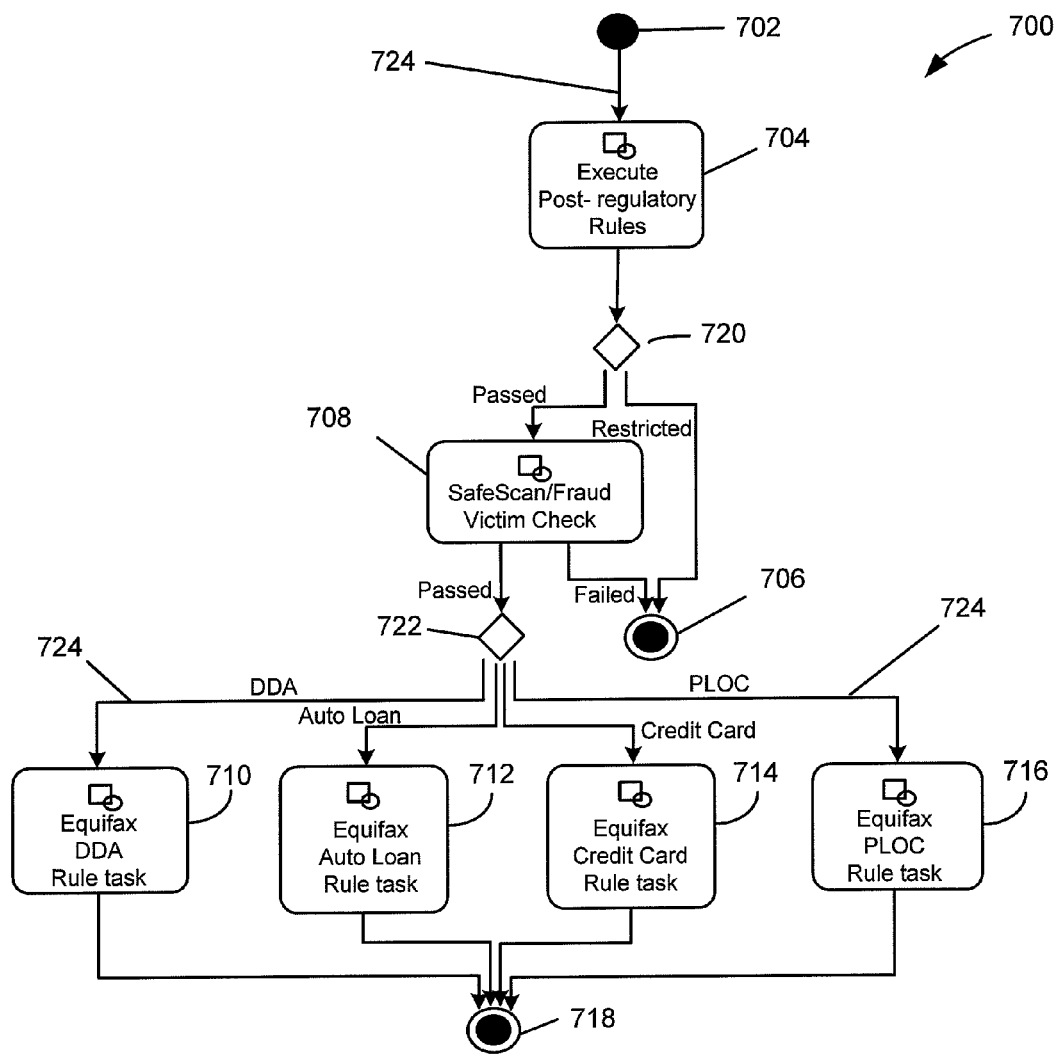
FIG. 7 illustrates another example of a user interface for a decision sub-engine in accordance with an embodiment of the invention.

FIG. 7 also illustrates a user interface 700 associated with a complex decision component 218. In this example, a user 112a-n can operate an input device such as a keyboard, mouse, or other input device associated with a client 102a-n to generate a decision flow for a set of decision rules, such as the rules generated in FIGS. 5 and 6. For example, a user 112a-n can generate a series of flow elements 702, 704, 706, 708, 710, 712, 714, 716, 718 and decision blocks 720, 722 connected with flow path lines 724 to illustrate a desired decision flow for a set of decision rules. In the example shown, each flow element can represent access of a data source 170a-n, application of a rule, application of a set of rules, a product offering, or any combination of these or other functions capable of being performed by the decision sub-engine 202. By way of example, flow element 702 represents the start of the decision flow, flow element 704 represents "execute post-regulatory rules," flow element 708 represents "SafeScan/Fraud Victim Check," flow element 710 represents "Equifax DDA Rule task," flow element 712 represents "Equifax Auto Loan Rule task," flow element 714 represents "Equifax Credit Card Rule task," flow element 716 represents "Equifax PLOC rule task, and flow elements 706 and 718 each represent ends of the decision flow. Furthermore, decision block 720 represents a determination whether a particular set of applicant data passes the rule set defined in flow element 704, and decision block 722 represents a determination whether the particular set of applicant data passes the rule set defined in flow element 708. Other flow path elements can be used in other combinations and other functionality in accordance with various embodiments of the invention.

c. Rules Engine Component

The data analysis layer 208 can also include, but is not limited to, a rules engine component 220. The rules engine component 220 can provide decision services. The use of the rules engine component 220 in systems and processes according to certain embodiments of the invention can be performed in such a way that a rules engine component 220 can be replaced with other implementations of a rules engine component 220 with relatively minimum integration efforts. One example of a rules engine component 220 can be a JRules™ rule engine distributed by ILOG, Inc., which can drive the decisioning described in the complex decision component 218 above.

d. Model Services Component

The data analysis layer 208 can also include, but is not limited to, a model services component 222. The model services component 222 can be a special type of attribute, criteria and complex decision service where instead of rendering a decision, this component 222 can be used to produce a numeric score within a predefined range where various pre-defined bands of numbers within a band define a particular level of risk associated with a applicant based upon the model score using their associated credit data.

e. Format Services Component

The data analysis layer 208 can also include, but is not limited to, a format services component 224. The format services component 224 can format incoming data from various data sources to a common format that can be understood by the rules engine component 220 and other components that utilize data from the data sources 170a-n. In one embodiment, data input and data output format specifications can be provided by a format services component 224, and an associated visual mapping mechanism can be used to transform the data input to a data output. One example of a format services component 224 can be a data transformation component distributed by SeeBeyond.

In addition to formats required by various components of an automated application processing and decision engine 120, data can also be formatted in a format desired by a user 112-an such as a credit provider or financial institution. One embodiment of a format services component 224 can accommodate user-defined formats for data input and data output. Such user-defined formats and other predefined formats can be stored in a data storage device such as an application and decision database 172.

Figure 8:
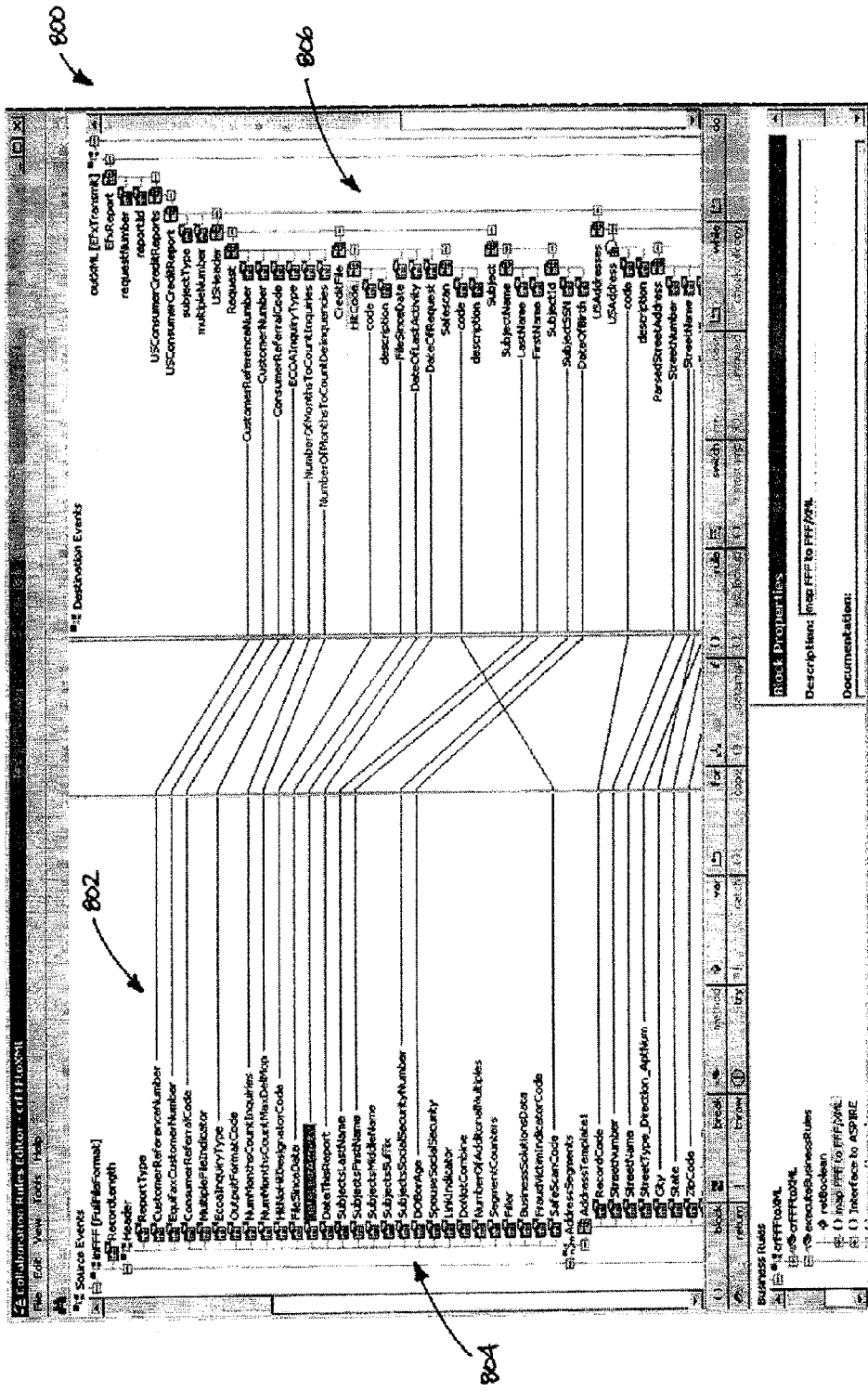
FIG. 8 illustrates another example of a user interface for a decision sub-engine in accordance with an embodiment of the invention.

FIG. 8 illustrates an example of a user interface 800 generated by a format services component 224. The user interface 800 shown provides a visual mapping of input data to corresponding output data. The user interface 800 can include a tree-type menu 802 for a user 112a-n to view various source events 804, associated destination events 806, and associated business rules 808. Source events 804 can include, but are not limited to, an instruction provided by a data provider specific to processing a particular application, an applicant or user's identity information, and details related to a particular application. Destination events 806 can include, but are not limited to, machine format data ready for consumption by another engine or device, such as a decision engine, transaction engine, or a storage device. Business rules 808 can include, but are not limited to, special parsing algorithms such as look-ahead fixed fielded data input, special conversion from string to date, integer, and sub-string inspection.

Services Layer

The decision sub-engine 202 can also include, but is not limited to, a services layer 222. The services layer 222 can include functionality to allow access to, and/or use of, and/or intercedes or mediates between the functionality of the data resource layer 206 and the data analysis layer 208, and between such functionality and external entities such as users 112a-n, and/or data sources 170a-n.

a. Customer User Data Component

The services layer 222 can include, but is not limited to, a customer user data component 228. The customer data component 228 can allow capture of business-specific details of a user 112a-n such as a user's business rules and business intelligence. In conventional software development models, the implementation of business rules pertaining to user's business intelligence can be specified in associated software code. By contrast, the customer user data component 228 can allow business rules to be defined intuitively using a graphic user interface. In one embodiment, a customer user data component 228 can provide an intuitive user interface. Such a user interface can permit capture of a user's business intelligence information in context of, for example, the application processing needs of the user 112a-n. Each user 112a-n may have specific definitions for the various business entities it intends to use for the application origination and decision. The customer user data component 228 can allow capture of the user's business intelligence information without need for extensive programming efforts. Accurate capture of user's business intelligence information using the terminologies that the particular user is familiar with can increase user confidence and can minimize impedance between application processing requirements and solution delivered to the user 112a-n. One unique aspect of the customer user data component 228 is a set of core implementation provided to expedite implementation of a solution and ability to capture a user's business intelligence information using nomenclature and relationship between the business entities as defined by the user 112*a-n*. Use of the component 228 can include delivery of core components using a standard tool to expedite implementation of solution for common business entities. According to one embodiment, a customer user data component 228 can be suitable software such as Transaction Logic Engine™ distributed by Versata, Inc.

In one embodiment, a user 112*a-n* such as a financial or business institution can define decision rules in systems and processes according to the present invention using suitable software such as Rules Engine™ distributed by ILOG, Inc. To define a decision rule, some or all of the following information is needed as well as any other information that may be desired or needed by the institution: application information, including what product/service the applicant has applied for; applicant information, including parameters such as whether the applicant already has an account with the institution; and attributes from a credit report, including analytical attributes derived from the applicant's credit report along with other statistical model scores to provide risk factors associated with the applicant. The application processing and decision engine 120 can provide this sort of information intuitively, in English-like language, near-natural language, or other plain or near plain language. This functionality can reduce any ambiguity that otherwise may be present if the decision logic were coded in a cryptic programming language that business people could not decipher.

Any desired business rules pertaining to business intelligence information, such as limit on size of an order, and validity of various values supplied, can be defined by a user 112*a-n* using, for example, a user interface 800 shown in FIG. 8. The user interface 800 shown can accept such data for a particular business entity or otherwise create a layout of a new user interface to show such data pertaining to a user solution. The drag-and-drop functionality of the user interface 800 shown facilitates a user-friendly environment that provides a relatively easy to use set of tools. Basic navigation of the workflow of the user interface 800 shown can also be defined at least to some extent as desired. Once a particular form, template or other layout has been defined, it can further be customized using any suitable web user interface editor tool.

Figure 9:
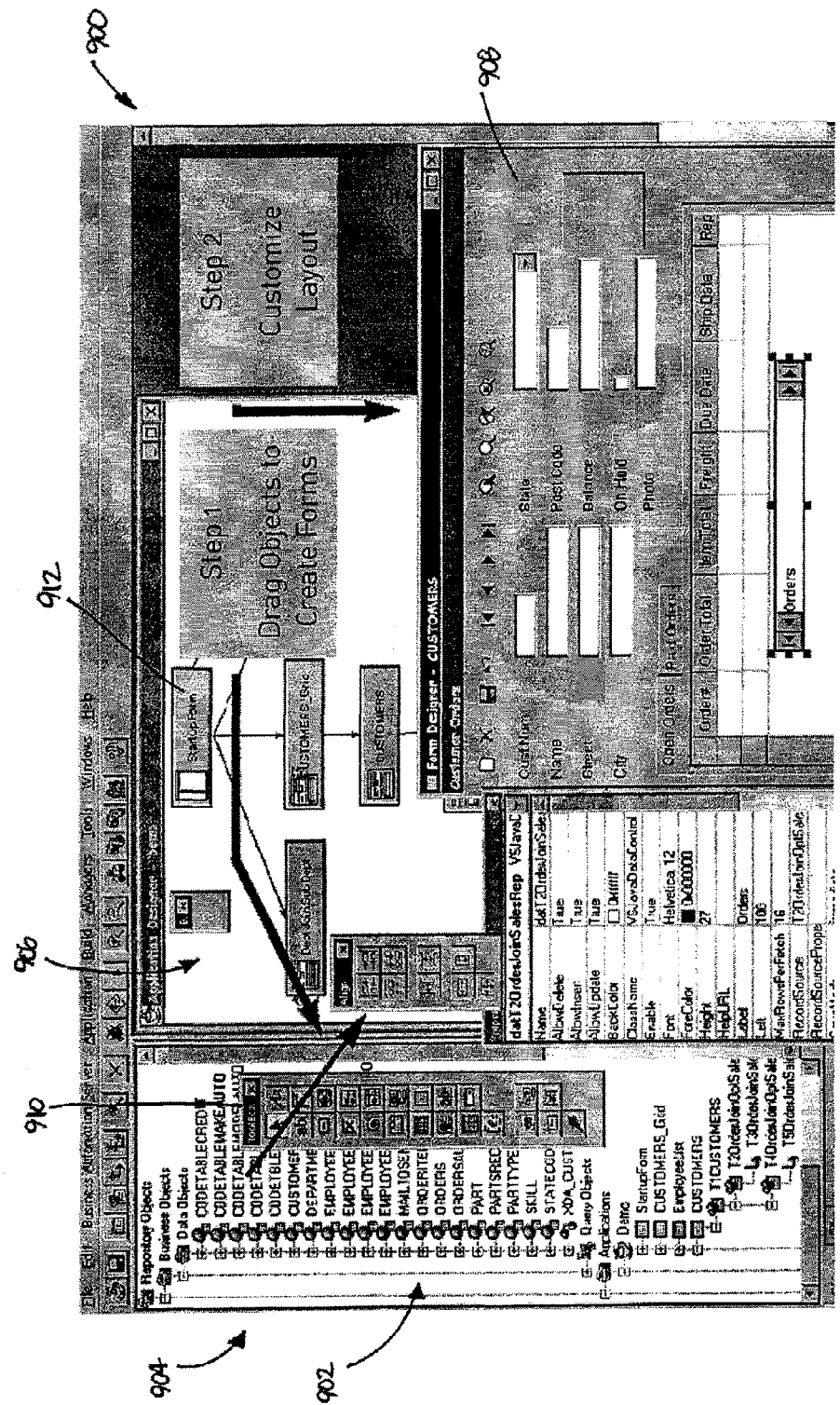
FIG. 9 illustrates another example of a user interface for a decision sub-engine in accordance with an embodiment of the invention.

For example, FIG. 9 illustrates a user interface 900 for a customer user data component 228. In the example shown, a user 112*a-n* can define how to organize and collect user solution business intelligence information. Using a data input device such as a keyboard or a mouse, a user 112*a-n* can select various objects 902 from a tree-type menu 904, drag one or more objects 902 to an associated workspace or field 906, and drop the objects 902 into the field 906 to automatically create one or more templates or forms 908. Various tools 910 associated with the user interface 900 can permit the user 112*a-n* to create and modify a form, such as defining one or more data entry devices for an application form, similar to 300 in FIG. 3. Such tools 910 can also permit a user to define a process flow within a form, such as a workflow 912 shown in the field 906. Forms, templates, process flow, workflows, and other outputs from the user interface 900 and/or the customer user data component 228 can be stored in a data storage device such as an application and decision database 172.

Figure 10:
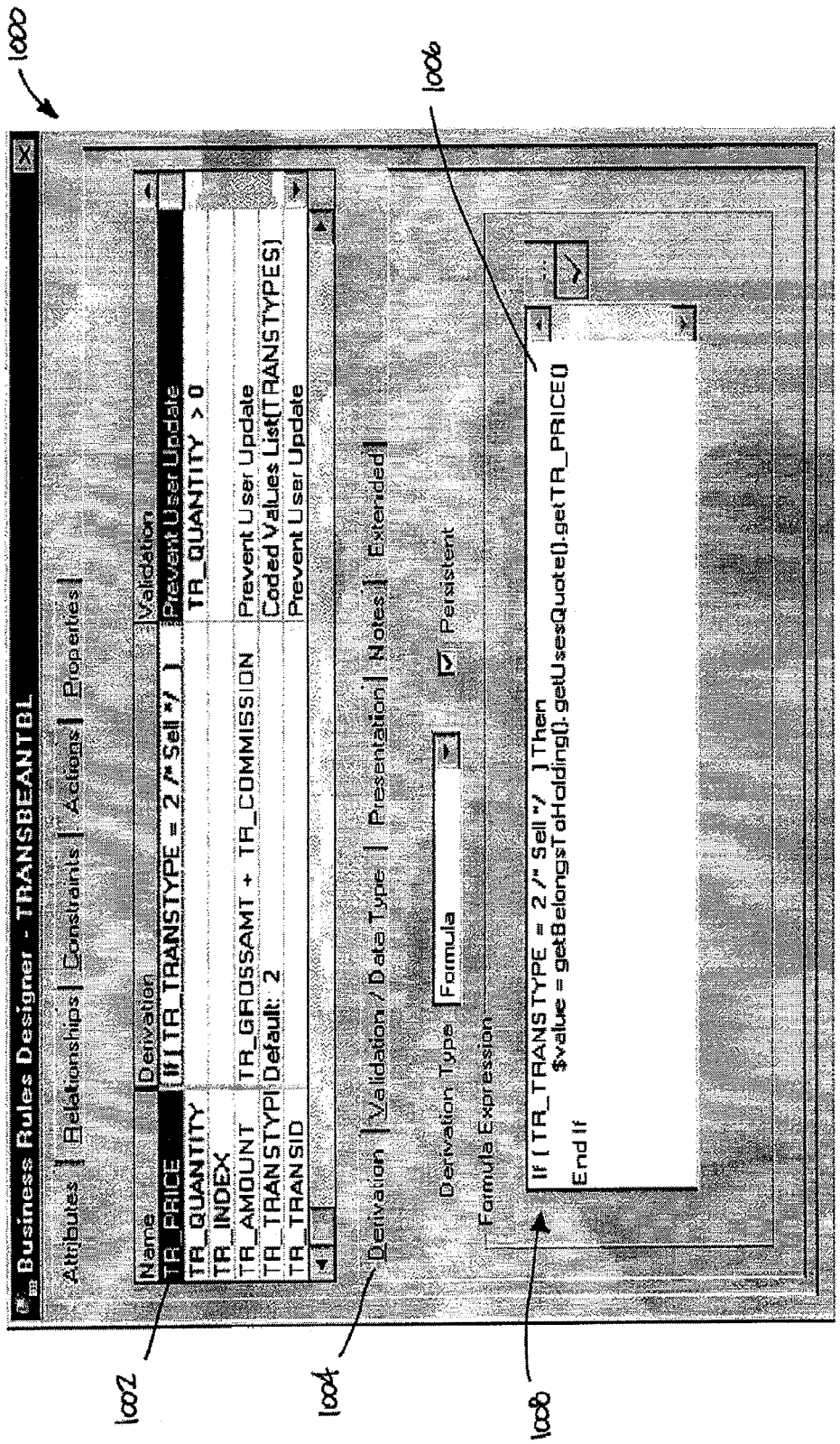
FIG. 10 illustrates another example of a user interface for a decision sub-engine in accordance with an embodiment of the invention.

FIG. 10 illustrates another user interface 1000 for a customer user data component 228. In the example shown, a user 112*a-n* can define one or more business rules incorporating a user's business intelligence. Using a data input device such as a keyboard or a mouse, a user 112*a-n* can select one or more objects for attribute definition, such as the object "TR_PRICE" 1002. Other tools can be used to define other aspects of business rules including, but not limited to, a relationships, constraints, actions, and properties. In the example shown, a derivation tool 1004 can be utilized to modify or further define an object, such as defining the formula expression for the object "TR_PRICE" 1002. In a corresponding field 1006 or other data entry device, a user 112*a-n* can review, edit, and approve the formula expression for a particular object. In the example shown, a corresponding formula expression 1008 for the object "TR_PRICE" 1002 can be displayed as, "If (TR_TRANS TYPE=2/*Sell*/) Then $value=getBelongsToHolding( ). getUsesQuote( ). get TR_PRICE( ) End If." Other types of formula expressions, derivations, and equations can be defined for objects in accordance with various embodiments of the invention.

Figure 19:
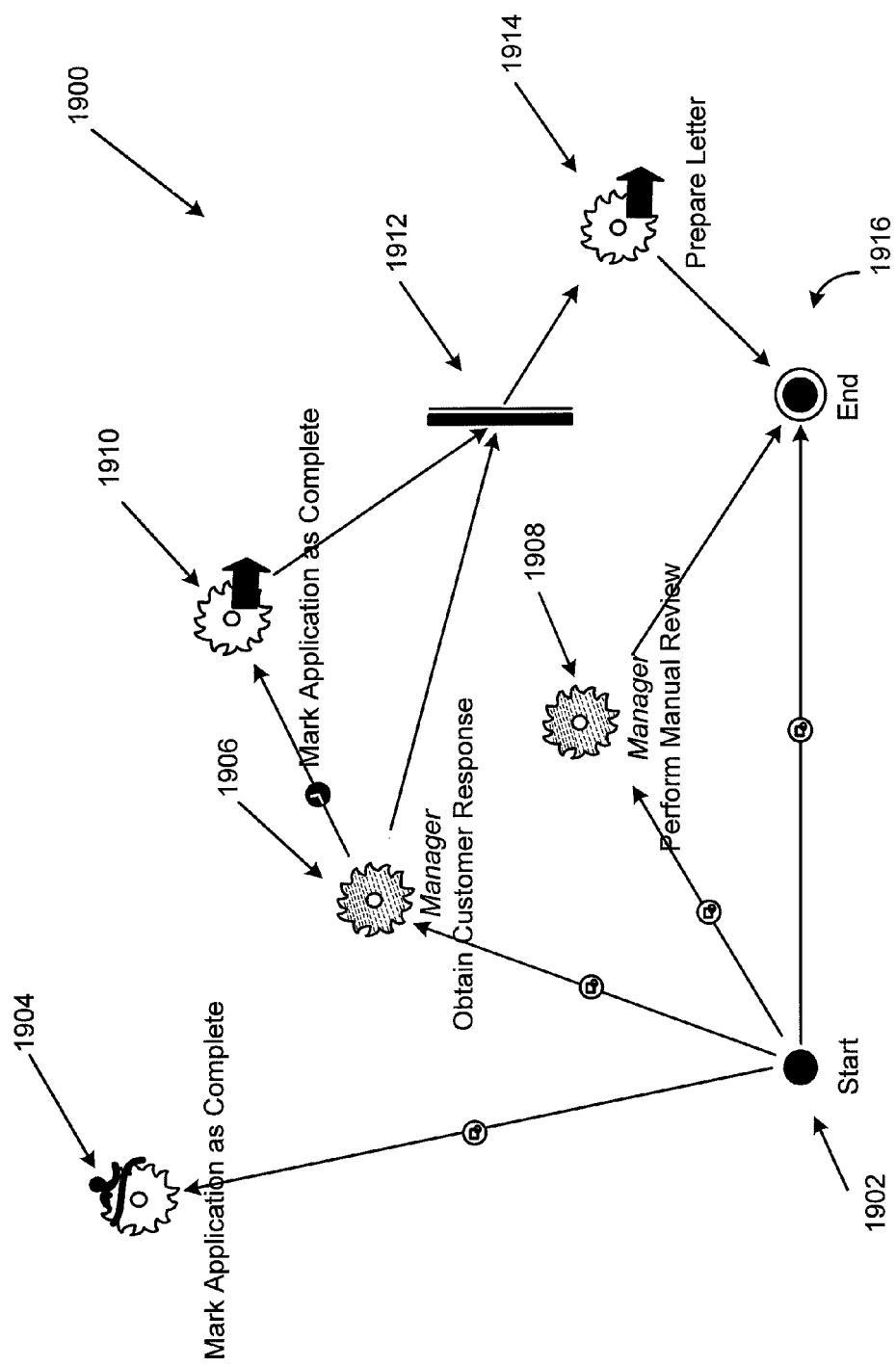
Figure 20:
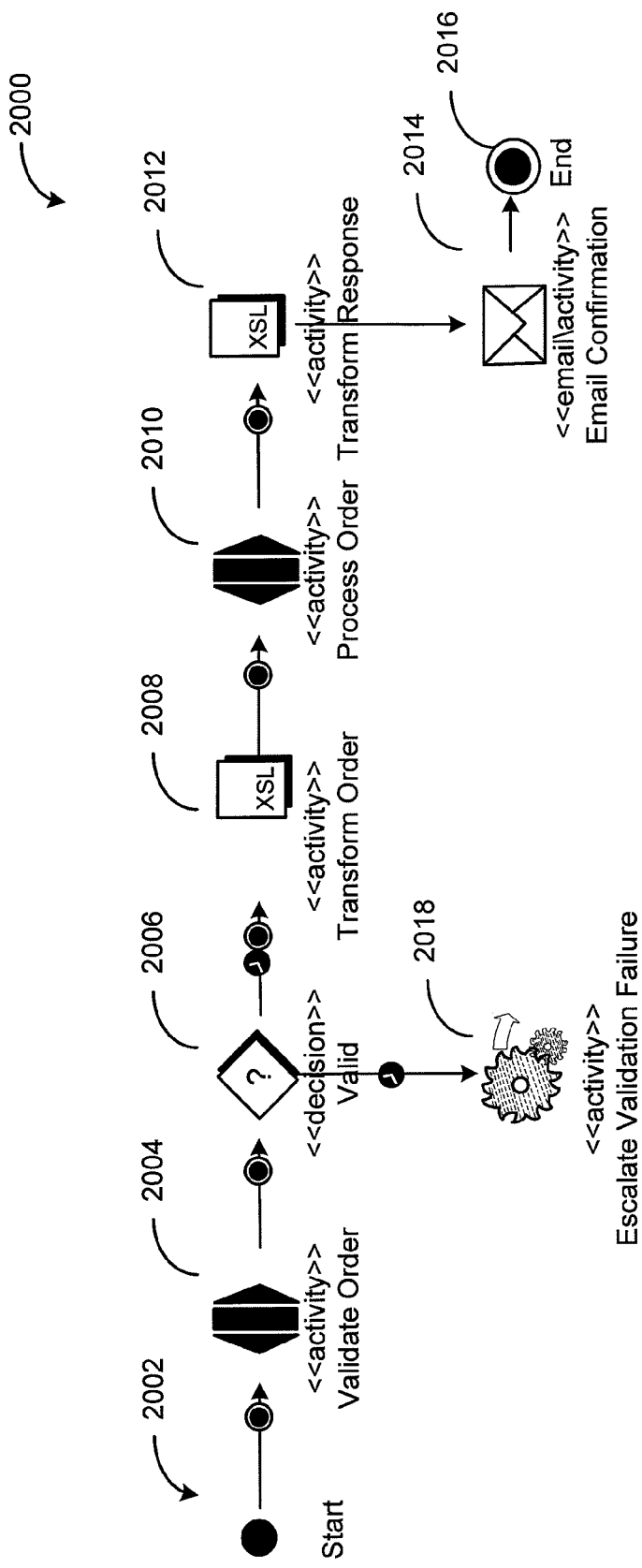
Figure 21:
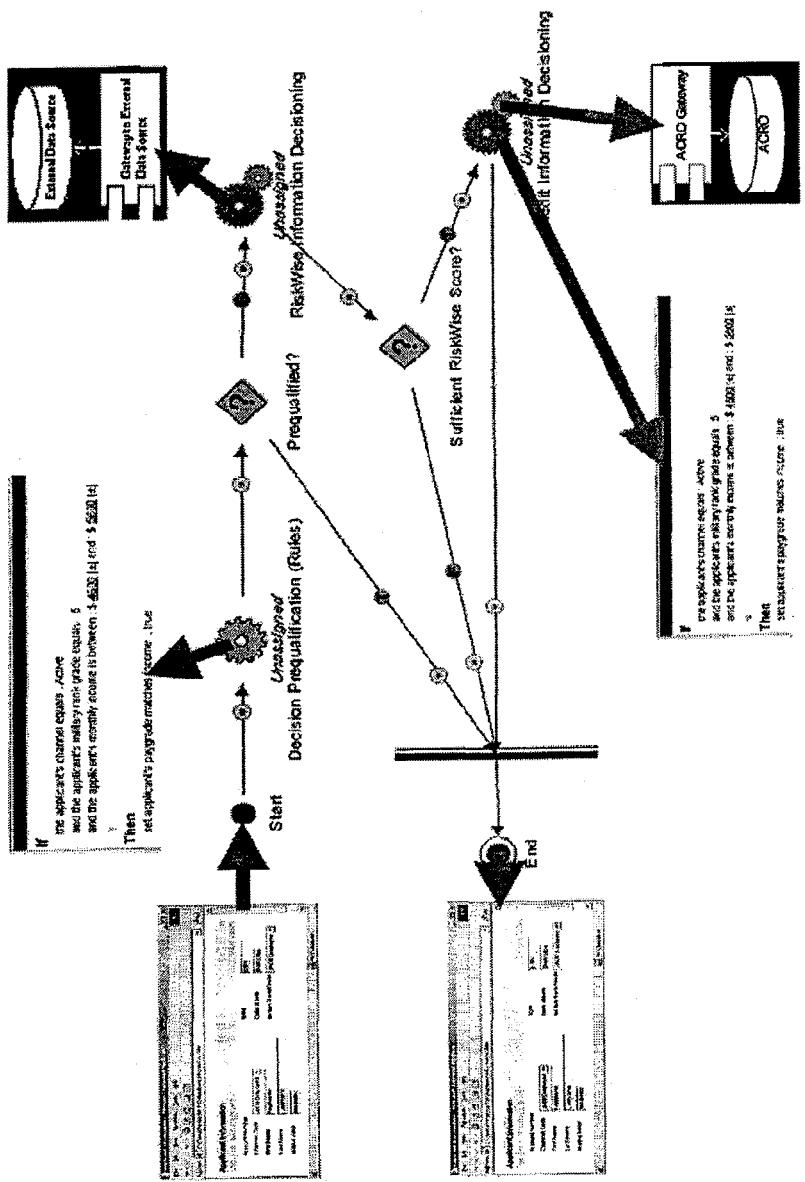

FIGS. 19-21 illustrate processes implemented by a customer user data component 228 for constructing one or more business or decision rules.

In one embodiment, rule changes can be controlled by the either, or both, users 112*a-n* and one or more system administrator. Depending on the level of control provided to a user 112*a-n*, rule changes submitted via the customer user data component 228 can be immediately implemented, or such changes can be submitted for approval to a system administrator.

b. Workflow Component

The services layer 222 can also include, but is not limited to, a workflow component 230. The workflow component 230 can support business process management, and in conjunction with the decision sub-engine 202, can provide queue management, work distribution (pull or push), work management and other workflow services. In one embodiment, a financial institution such as a bank or other type of business can desire to implement business-specific processes for application processing. These needs can arise prior to a decision being rendered on a particular application, or after the decision has been rendered. The need for a business process prior to decision being rendered can be for some or all of the following reasons, among others: not all papers needed to complete the application are present (such as employment verification papers); a partial application may be accepted and even decisioned, however, prior to fulfilling the product being requested in the application, such information will typically need to be verified (as governed by the business process needs of the establishment); the applicant may apply for the product through alternate channels, but completion of the application requires the applicant to be present at some specific location where the application processing will continue; the nature of the application requires involvement of some specific role players in the business, such as supervisor, branch manager, etc., associated with a user 112*a-n*.

Post-decision product fulfillment can also require adoption of a business process for some or all of the following reasons among others: (1) The applicant needs to be made aware of the decision; however, there may be a delay before the user 112*a-n* such as a financial institution may receive an acceptance of the offer. In such cases, there may also be need for the timely follow-up with the applicant. It may also be possible that after certain time elapses with no response, it is automatically deemed that the applicant is not interested in the product. (2) Certain regulation requirements may necessitate completion of certain steps, such as mailing a letter to the applicant to make them aware that a credit report was accessed as part of their application processing. (3) Type of offer may require involvement of certain specific roles associated with a user 112a-n, such as manager of a financial institution to fulfill the order.

An automated application processing and decision engine 120 can provide users 112a-n with tools for custom business process implementation. Such tools can capture aspects of these business process requirements and provide an environment to enact and execute these business process models as part of application processing.

A workflow component 230 can also be used to define process flow to assemble all other services (data access from various data sources at different stages of application processing, rule processing with the available data, manual intervention for data entry, input processing and output formatting) together to facilitate application processing. The workflow component 230 can allow implementation of user specific business process management requirements in the space of application origination and decision. In a preferred embodiment, a workflow component 230 can be implemented using either or both Process Logic Engine™ distributed by Versata, Inc. and JRuleS™ distributed by ILOG, Inc.

In one embodiment, the workflow component 230 can permit the decision sub-engine 202 to perform prescreen processing on transactions, one at a time. In this manner, a user 112a-n such as a financial institution can manage the selection of potential or current applicants who may be pre-qualified for a particular user's products or services and to whom the user may make a firm offer of credit to an applicant based on a particular application associated with the applicant.

FIGS. 19-21 described below illustrate process diagrams that can be generated and implemented by a workflow component 230.

c. Security Sub-Component

The services layer 222 can include, but is not limited to, a security component 232. The security component 232 can provide a mechanism to control access of a particular user's solution assets using declarative roles-based access control. The implementation of the security component 232 can provide users 112a-n with the ability to self manage access to implementation of their system. The security component 232 can allow delegation to the user 112a-n of management of system access, as desired by the user 112a-n. This component 232 can also allow the user 112a-n to control access to all assets of their system. One aspect of this particular component 232 is, therefore, delegated and comprehensive security control based upon role-based access control.

The following Table 1 shows an example of role based access control implemented by a security component 232, for processing an application form, such as 300 in FIG. 3:

TABLE 1

Role Based Access Control

| Tab | Administrator | Supervisor | CSR |
| --- | --- | --- | --- |
| Credit Order | No | Yes | Yes |
| Credit Results | Yes | Yes | No |
| Override | No | Yes | No |
| Supervisor | Yes | Yes | No |

Another aspect of role based access control for a security component 232 is selective access to each form, application page, or webpage based on a particular user's role. If a particular user 112a-n does not have access to a particular page, the page will not appear on an output device such as a display device associated with a client 112a-n that the particular user 112a-n is operating. The role based access control can also be extended to functionality on a main menu or lower level sub-menus, commands, and features.

Other features for a security component 232 that can be integrated with functionality of the presentation/interface layer 204 include specific uniform resource locators (URLs) or Internet addresses. Each user 112a-n such as a credit provider or financial institution can be issued a unique and distinct uniform resource locator to access the system. The URL can follow a standard naming convention and can include parameters that indicate the particular user and system name, such as www.interconnect.username.com/clientmenu.

Another feature for a security component 232 is a login page that can be integrated with the presentation/interface layer 204. Each user 112a-n can be required to enter a unique user ID and password prior to accessing functionality associated with the automated application processing and decision engine 120. Error messages can be displayed for incorrect credentials, excessive login attempts (as defined by the user 112a-n such as a credit provider or financial institution), missing information, no user ID, and no email address on file. Functionality can be implemented for instances if a password has expired, then a "Reset Password" page can be displayed. If the user 112a-n clicks the "e-mail my password" link, the "Password Sent" page displays if the user 112a-n is using the correct password. If the user e-mail is not on file, a message to contact a system administrator can be displayed. In any event, once the user 112a-n has successfully logged in, a "Message Center" page can be displayed, and can provide communications to the user 112a-n from a system administrator.

Some or all of the functionality provided by the security component 232 and other components of the automated application processing and decision engine 120 can cooperate to combat fraudulent application submission.

d. Trialing/Challenger Component

The services layer 222 can include, but is not limited to, a trialing/challenger component 234. The trialing/challenger component 234 is a tool that can provide an online, production environment for testing various strategies including alternative strategies for business rules, scores, models and or processes, etc. The trialing/challenger component 234 can enable a user 112a-n such as a financial institution to employ predefined and/or user-defined strategies for managing and maximizing the profitability of a portfolio. The trialing/challenger component 234 can enable the user 112a-n to establish one or more trials for strategies ranging from formulas for criteria calculation, business parameters, product offerings to decision rules, and to perform statistical analysis of results produced as a result of trial. It allows the user 112a-n to establish any number of combinations and mechanisms to feed data to evaluate alternate strategies. This component 234 with all its potential is unique in the space of application processing and decisioning, because among other things, the component 234 can place in the hands of the user 112a-n, such as a financial institution, new and improved control of evaluating impact of various parameters to the risk evaluation of application processing.

In one embodiment, after implementation of decision rules, or if desired during initial build of the decision rules or at any other desired time, some users 112a-n may desire to compare different implementations in order to determine the best strategy and mechanism for minimizing the risk and at the same time maximizing the number of applications fulfilled. For such analysis, users 112a-n can build various implementations of rules and other mechanisms and send data through them in order to analyze the results. An application processing and decision engine 120 can allow definition of gating criteria to send certain transactions and/or datasets to alternative or various rule structures or other mechanisms that have been developed, in order to evaluate the results and determine what is the best way to proceed.

In one embodiment, the trialing/challenger component 234 provides an intuitive tool that users 112a-n such as a financial institution can use to evaluate the potential impact of employing new theories or strategies on their portfolios by testing various scores, models and other scenarios against off-line, archived data without impact on the production environment. In some instances, users 112a-n may desire to test new strategies to see if they are on the right track before requesting the resources and time necessary to make a change in their production environment. In another embodiment, a non-production version of the existing configuration (created with historical production data or test data) can be accessed by the trialing/challenger component 234, changes are applied and results are produced real-time for review and evaluation. In this manner, a user 112a-n can utilize the results to understand what a challenger strategy may actually need to look like in order to produce the desired results. Similarly, if a challenger strategy is not performing as expected, the trialing/challenger component 234 can allow for further testing of any changes that should be made prior to placing them into production. A user 112a-n can utilize the results to understand how proposed changes to a score cutoff, score card model, approval practices or business rules may be impacted.

In another embodiment, a user 112a-n such as a credit provider or financial institution can utilize a trialing/challenger component 234 to create a "champion" strategy. A "champion" strategy is an approved set of rules used to decision the majority of a particular type of loan application (for example, 85% of the applications may be processed under the champion rule set) and any number of challenger strategies (alternate rule sets) can be used to decision the remainder of the loan applications (for example, 5% of the remaining applications use alternate rule set 1, 5% use alternate rule set 2, and 5% use alternate rule set 3). Each of the outcomes can be monitored via an associated reporter component for a period of time to determine the feasibility of using the alternate rule sets. The user 112a-n can use production data to monitor the impact to their portfolio under the challenger versus champion scenarios. The number of challenger scenarios is limited only by the user's ability to develop and manage these challengers in their various environments, and of the diminishing effectiveness of using smaller and smaller percentages of the application data. In this manner, users 112a-n can determine the best strategies for managing and maximizing the profitability of their portfolios. The following scenarios represent examples of evaluations that can be performed with a trialing/challenger component 234. For example, a scenario involving any criteria calculation algorithm can evaluate changes to a criteria calculation algorithm to determine the impact to the decision. Furthermore, a scenario involving a user's business information can evaluate changes to the user's business intelligence information (different promotions, calling plans, redistribution of plans across zip codes etc.). Moreover, a scenario involving decision logic can evaluate changes to the decision logic from any of the following (or a combination thereof: decision rules, use of different criteria (including changed criteria calculation algorithm), changed score cut-off ranges (decision matrix). Finally, a combination of any of the above scenarios can evaluate the impact of changes to user's business by changing parameters such as business information and decision logic.

In another embodiment, the trialing/challenger component 234 can also provide a framework for loading, implementing and executing a user's own scorecard or model used in the decisioning process. In one embodiment, the trialing/challenger component 234 can be a data agnostic system that enables the rapid setup of statistical models regardless of the data source or attribute requirements of the model. Some users 112a-n can leverage custom models in their decision process. With the trialing/challenger component 234, a user 112a-n can deploy such models into production. The trialing/challenger component 234 can utilize a tool-based approach to code, and can deploy to production various mathematical calculations and decision trees typical to a statistical model.

FIG. 17 illustrates a process that can be implemented by a trialing/challenger component 234.

e. Backend Components

An automated application processing and decision engine 120 can operate in conjunction with and/or can be integrated with various backend components including but not limited to a letter writer component 236 and reporter component 238. For example, in one embodiment, a letter writer component 236 and reporter component 238 can operate as respective components of the services layer 210 shown in FIG. 2. The letter writer component 236 can provide the ability for users 112a-n to generate letters including, but not limited to, welcome, disclosure and declination letters. Users 112a-n can utilize a local print option feature of the system and/or leverage outsourced mail services provided by a service provider, such as Equifax, to handle both print and mail requirements. Field values can be determined by the user 112a-n, and can be sent to a third-party company that provides letter generation capabilities so that letters can be created and sent to the user's clients. The timing of creating and sending the letters can be based on the user's needs. In one embodiment, there can be more than one letter type per user 112a-n. The following are examples of some of the templates available: welcome letter, auto decline letter, no reason—bureau letter, counter offer letter—with condition. The user 112a-n can provide the templates for each letter type. The data fields can be populated at the desired placeholders in the letter template to create the final letter. In the instance of an applicant and co-applicant sharing the same address, then one letter can be sent to the address. If the applicant and co-applicant have different addresses, then separate letters can be sent to each address. If any deviation from the above is required, the letter writer component 236 can be customized to accommodate the user's specifications.

The reporter component 238 can provide a range of reporting options from rudimentary to comprehensive. A variety of standard reports, seamless uploads to key reporting vendors, and data streams to users 112a-n who maintain proprietary or open reporting systems can be supported. The reporter component 238 can also deliver reports online through a user interface to meet users' general needs. The user 112a-n can select a desired report from drop-down menus, then select date range and output format. The desired report can be displayed real time at the user's desktop. Reports can be made available in various formats including, but not limited to, portable document format (PDF), Microsoft Word™, Microsoft Excel™, or comma delimited formats. Such reports can be summary reports or industry-specific reports.

In one embodiment, a user 112a-n such as a financial institution can desire that a report or information about the decision or diligence be prepared and sent a certain way, including but not limited to one or more of the following: (1) In cases where application was submitted using a real time or online user interface provided by systems and processes according to certain embodiments of the invention, the decision is expected in real time using the user interface, (2) In cases where the application processing request is sent using a communication protocol, such as socket connection, .NET connection, web services or other protocol, a decision is expected back as response to the request; and (3) In cases where a batch file with a list of applications is sent, some users 112*a-n* may desire to receive a response back in batch file form, while some other users 112*a-n* may desire access using a user interface to receive the decision result.

Examples of reports that can be generated by a reporter component 238 can include, but are not limited to, credit risk reports providing metrics regarding the characteristics of a decision or an application, a decision summary report showing aggregate summary information; a bureau summary report summarizing the total number of transactions sent to the data source; a decision detail report showing individual detail information for a specific transaction or group of transactions including data source accessed, criteria information, scores, offers, and data; score distribution reports; BEACON™ reports (by predefined point increments such as 10); Telco 98 score distribution reports; volume reports which provide metrics by logical units relevant to the user 112*a-n* (region, channel, group, etc) in logical calendar units (hour, day, week, month, etc); weekly activity reports that provide volume metrics broken down by the day of the week (Monday-Sunday); hourly activity report that provide volume metrics broken down by the hour of the day; performance reports intended to measure user performance at the individual user level; current work items showing current work items that exist in the system; security reports intended to provide metrics regarding internal users logged on to the system; user detail report showing all current user details (names, phone numbers, user IDs, etc), and date of last log in; user transaction activity report showing details by date about when users are submitting applications on the system.

In one embodiment, the reporter component 238 can generate reports on a regular schedule, such as hourly, daily, weekly, monthly, yearly, or any other predefined period. In another embodiment, the reporter component 238 can generate customized reports such as ad hoc reports and data extracts that are specific to user requirements.

Users 112-*an* can utilize a reporter component 238 of an automated application processing and decision engine 120 to employ any of a number of different mechanisms to receive results. If the application was submitted using a user interface, such as the application form 300 in FIG. 3, then the preferred mechanism to receive response back can typically be through the same user interface. If the request was sent by other mechanism then it may be convenient to receive results also using the same method, such as a system-to-system transaction. The format of such a transaction could be EDI formats, XML or many other industry formats. Formatting functionality can generate responsive information in the format preferred by the user 112*a-n* such as a financial institution. This feature can allows faster integration with the system since the user 112*a-n* may not have to understand or change their system to accommodate a specific format.

Figure 11:
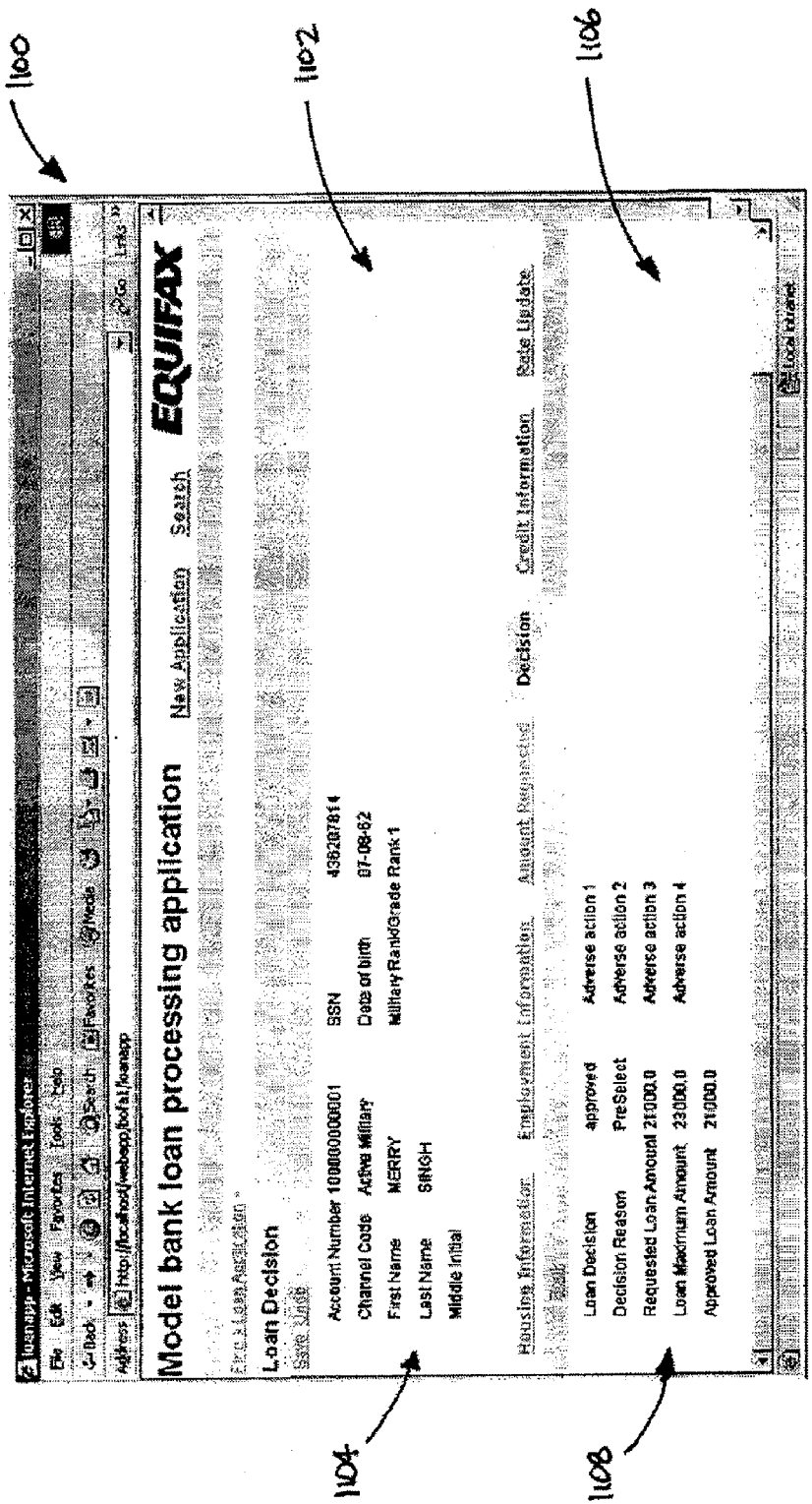
FIG. 11 illustrates another example of a user interface for a decision sub-engine in accordance with an embodiment of the invention.

FIG. 11 illustrates a user interface 1100 that can be implemented by a reporter component 238. The user interface 1100 shown displays one or more decisions generated by a decision sub-engine 202 based in part on at least information collected by the application sub-engine 200. In this example, a decision for a bank loan application is displayed for a particular applicant, "Merry Singh." An upper portion 1102 of the user interface 1000 displays applicant information 1104 collected by or otherwise received by the application sub-engine 200, similar to the types of information collected in the application form 300 of FIG. 3. A lower portion 1106 of the user interface 1100 displays decision information 1108, similar to the information 404 shown in FIG. 4, associated with the applicant information 1104. Decision information can include, but is not limited to, a load decision, decision reason, requested loan amount, loan maximum amount, and approved loan amount.

Figure 12:
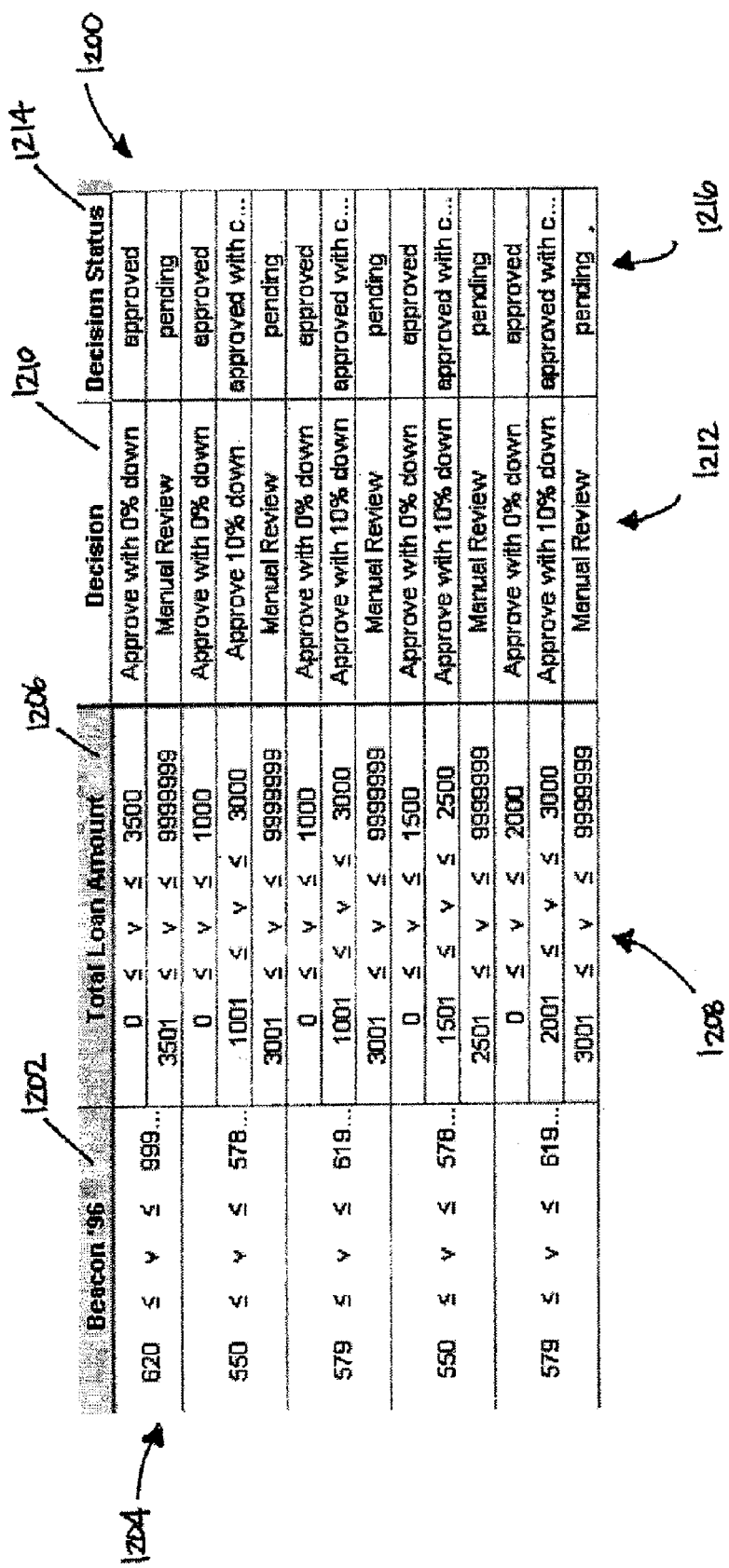
FIG. 12 illustrates another example of a user interface for a decision sub-engine in accordance with an embodiment of the invention.

FIG. 12 illustrates another user interface 1200 that can be implemented by a reporter component 238. The user interface 1200 shown displays a tabular interface with one or more decisions generated by a decision sub-engine 202 based in part on at least information collected by the application sub-engine 200. In this example, a decision based in part on an applicant's Beacon™ credit score is displayed. A leftmost portion 1202 of the user interface 1200 shown displays "BEACON '96" credit score range information 1204 such as "$620 \leq v \leq 999$," "$550 \leq v \leq 578$," "$579 \leq v \leq 619$," "$550 \leq v \leq 578$," and "$579 \leq v \leq 619$." An adjacent column 1206 displays corresponding "Total Loan Amount" information 1208 such as "$0 \leq v \leq 3500$," and "$3501 \leq v \leq 9999999$" for the BEACON™ credit score range "$620 \leq v \leq 999$." Another adjacent column 1210 displays corresponding "Decision" information 1212 such as "Approve with 0% down" for the total loan amount information of "$0 \leq v \leq 3500$," and "Manual Review" for the total loan amount information of "$3501 \leq v \leq 9999999$." A rightmost column 1214 displays "Decision Status" information 1216 such as "approved" for the corresponding decision "Approve with 0% down," and "pending" for the corresponding decision "Manual Review." This and other information, including but not limited to, credit scores, Beacon™ credit score ranges, total loan amounts, decisions, and decision status can be displayed or otherwise output in a tabular interface or any other user interface by a reporter component 238. Such information can also be stored for retrieval, further analysis, or transmission in a data storage device such as an application and decision database 172.

FIG. 13 illustrates another user interface 1300 that can be implemented by a reporter component 238. The user interface 1300 shown displays a tabular interface with one or more decisions generated by a decision sub-engine 202 based in part on at least information collected by the application sub-engine 200. In this example, a decision based in part on an applicant's Beacon™ credit score is displayed with columns and information similar to columns 1210, 1214 and information 1212, 1216. Additional columns illustrated in this example are a leftmost column 1302 displaying corresponding "Multi-Screen 2.0" information 1304. The column adjacent to the left portion of the user interface 1300 shown include column 1306 displaying corresponding "DDA" information 1308, column 1310 displaying corresponding "PLOC" information 1312, and column 1314 displaying corresponding "Credit Card" information 1316. This and other information, including but not limited to, credit scores, Beacon™ credit score ranges, total loan amounts, decisions, and decision status can be displayed or otherwise output in a tabular interface or any other user interface by a reporter component 238. Such information can also be stored for retrieval, further analysis, or transmission in a data storage device such as an application and decision database 172.

Processes

An automated application processing and decision engine 120 can implement various processes and methods to process an application and/or to generate a decision associated with the application. The following processes and methods shown in FIGS. 14-22 can be implemented by some or all of the components of an automated application processing and decision engine 120 in accordance with various embodiments of the invention.

a. Processing a New Application

FIG. 14 illustrates a process for collecting information for a request for credit. In one embodiment, an application and associated information are related to obtaining a decision for granting or denying an applicant request for credit. In another embodiment, the application and associated information are related to obtaining a credit provider decision or determining whether to extend an offer for credit. In these and other embodiments, the example process 1400 shown in FIG. 14 can be implemented. The example process begins at block 1402, wherein a user interface collects applicant information. In the embodiment shown in FIG. 14, a predefined form, such as the application form 300 shown and described in FIG. 3, can be generated by an application sub-engine 200, and utilized to collect applicant information from a user 112a-n viewing the application form and operating a respective client device 102a-n. A user 112a-n, such as a credit provider or financial institution, can enter information in the application form 300 using an input device such as a keyboard and/or mouse associated with a client 102a-n. In one embodiment, the information is associated with an applicant requesting credit, or is associated with a prospective applicant to whom credit may be extended.

Block 1402 is followed by block 1404, the applicant information is submitted to an application engine for processing. In the embodiment shown in FIG. 14, an application sub-engine 200 receives the applicant information via the application form 300 for processing.

Block 1404 is followed by decision block 1406, in which a validity check is performed. In the embodiment shown in FIG. 14, the application sub-engine 200 can perform one or more validity checks on the applicant information. The application sub-engine 200 can perform a check whether information has been entered in any number of predefined required fields. For example, the application sub-engine 200 can permit certain fields to be associated with predefined requirements relative to availability, formatting, and content. In general, such fields will have to be validated relative to these issues. By way of further example, a user 112a-n such as a credit provider or financial institution can designate required fields to be completed such as name, address, social security number, tax identification number, and product selection fields. In this example, such required fields must to be completed prior to processing the application form 200.

As indicated by branch 1408, if the application sub-engine 200 determines that the applicant information in an application form contains one or more missing required fields, then the process returns to block 1404. That is, if information has not been entered or is otherwise incomplete in one or more required fields, the application sub-engine 200 can prompt the user 112a-n to enter or otherwise correct the information until the required fields contain valid information.

Furthermore, the application sub-engine 200 can perform a check whether particular information from a user 112a-n is valid. The application sub-engine 200 can access one or more data sources 170a-n, compare user-entered information to predefined information or previously stored information, and perform one or more checking routines or methods.

As indicated by branch 1410, if the application sub-engine 200 determines that information is not valid, then the process 1400 returns to block 1404. That is, the application sub-engine 200 can review and edit one or more of the fields to validate information entered into the fields by the user 112a-n. For example, the application sub-engine 200 can apply a particular user's editing rules before a form, such as application form 300, is to be processed. In this manner, the application sub-engine 200 can check and validate user-entered or provided information against previously collected information stored in one or more data sources 170a-n. If information is not correctly entered in one or more fields, the application sub-engine 200 can utilize a conventional correction routine or method to edit the information. If the information does not match information in one or more data sources 170a-n, the application sub-engine 200 can prompt the user 112a-n to re-enter or otherwise provide correct or additional information in the application form 300. The application form 300 can be resubmitted and exchanged between the user 112a-n and the application sub-engine 200 as many times as needed until the application form 300 and associated information has been validated by the routines or methods, i.e. accepted by the application sub-engine 200.

Decision block 1406 is followed by block 1412, in which a new application identification code is associated with the validated application. In the example shown in FIG. 14, the application sub-engine 200 associates the validated application with a new application identification code or an application ID. The application form, associated information, and new application identification code or an application ID can then be stored by the application sub-engine 200 in a data storage devices such as an application and decision database 172. In this manner, the application form and associated information can be stored and subsequently tracked by its associated application identification code or an application ID for later processing by other components of the automated application processing and decision engine 120.

After block 1412, the process 1400 ends.

b. Duplicate Matching Process

Once a request for credit has been successfully submitted via a form such as an application form, the application sub-engine 200 can check for duplicate requests by matching elements of information in a current application form with elements of information from previously submitted applications stored in a data storage device such as an application and decision database 172. In many instances, users 112a-n such as credit providers or financial institutions want to ensure that requests being processed have not been previously processed by the automated application processing and decision engine 120 or another associated component or entity. If a particular request is identified as a duplicate, the user 112a-n has the option of either retracting the new request and utilizing a previously stored or otherwise processed application and any related decision information, or submitting the new request if information associated with an applicant has changed or is not a duplicate request. In this manner, duplicate applications can be identified relatively early in the application and decision process, and relevant results on previously decisioned applications can be returned to the user 112a-n without having to re-process an application for a particular applicant.

FIG. 15 illustrates a process 1500 for determining a duplicate match. In the embodiment shown in FIG. 15, a duplicate match can be determined by an application sub-engine 200 comparing a new application and associated applicant information with a previously stored application and its respective associated applicant information.

The process 1500 begins at block 1502, in which a new application ID is received. In this embodiment, the application sub-engine 200 receives the new application ID, or otherwise generates the new identification ID when a new application is validated, such as in the process 1400 shown and described in FIG. 14.

Block 1502 is followed by block 1504, in which the new application, associated applicant information, and new application ID are called upon by or otherwise transmitted to the application sub-engine 200 for processing. In the embodiment shown in FIG. 15, the application sub-engine can determine one or more elements such as fields in an application form 300 to compare with previously stored elements stored in a database such as an application and decision database 172.

Block 1504 is followed by block 1506, in which the application sub-engine 200 calls to a database such as an application and decision database 172 for previously stored elements.

Block 1506 is followed by decision block 1508, in which a determination is made whether a match exists between any element in the new application and previously stored elements in the database. That is, the application sub-engine 200 can compare the new application and associated applicant information with previously stored applications and associated applicant information stored in the application and decision database 172. Utilizing conventional methods, devices, and routines, the application sub-engine 200 can determine whether a duplicate match exists.

As indicated by branch 1510, if a duplicate match exists, then the "YES—duplicate" branch is followed to block 1512. In block 1512, the previously stored application and associated decision can be called upon by the application sub-engine 200 and displayed for the user 112a-n. The user 112a-n can be notified that a duplicate match exists, and the user 112a-n can utilize the previously stored application and associated decision information can be displayed. In one embodiment, the user 112a-n can be provided with an option to either retract the new application and utilize the previously stored application and any related decision information, or continue to submit the new application if information associated with an applicant has changed.

After block 1512, the process 1500 ends.

Returning to decision block 1508, and indicated by branch 1514, if a duplicate match does not exist, then the "NO—new" branch is followed to block 1516. In block 1516, the new application and associated applicant information can be transmitted for further processing by other components of the automated application processing and decision engine 120. The user 112a-n can be notified that the new application does not have a duplicate match, and therefore the status of the new application can be changed to "pending" application.

After block 1512, the process 1500 ends.

c. Decisioning an Application

Once an application has been accepted for processing by the application sub-engine 200 and designated as "pending," the application can be transmitted to the decision sub-engine 202 for processing and decisioning. The automated application processing and decision engine 120 can perform pre-processing calculations and can process any business rules established by a user 112a-n for a particular application or project. Depending on predefined process flows such as those dependent on particular elements of the application, particular process elements can be executed with respect to the application while the application is ending. For example, information such as whether a particular applicant meets minimum income or residency standards can trigger the application of a particular set of user-specific business rules for the purpose of creating one or more work items or rendering a workflow decision. In another example, the application may also be in a workflow awaiting action from a user's employee or agent to change state and continue the process. For example, the application is submitted and assigned to a manual review work list due to a credit file no hit. In any event, once the application is in a decisioned state, the application evaluation is complete and a decision can be rendered. In one embodiment, the decision can be a direct answer to a product or service requested by an applicant and can represent an end state of the application evaluation process. In another embodiment, the decision can be a direct answer to a product or service requested by a user 112a-n for offering to a potential applicant. After the decisioning process, the decision and associated information can be transmitted to or otherwise handled by post-processing functions provided by or in conjunction with the automated application processing and decisioning engine 120. Such functions can include the preparation of reports, letters, data dumps, etc. When no workflow activities remain, the application can be considered in a "completed" state.

FIG. 16 illustrates a process 1600 for decisioning an application. In the embodiment shown in FIG. 16, a decision can be determined by a decision sub-engine 202 utilizing applicant information associated with a new application and associated information in one or more data sources 170a-n.

The process 1600 begins at block 1602, in which a pending application is called upon by or otherwise transmitted to the decision sub-engine 202 for processing.

Block 1602 is followed by block 1604, in which the decision sub-engine 202 receives the pending application.

Block 1604 is followed by decision block 1606, in which a determination is made whether the pending application is approved. Various decision processes, methods, routines can be applied to the pending application to determine whether to approve the pending application. Examples of methods that can be used with automated technologies are described and shown as, but not limited to, 402 and 404 in FIG. 4, 500, 506, 508 in FIG. 5, 602 and 604 in FIG. 6, 1200 in FIG. 12, and 1300 in FIG. 13. Examples of other decision processes, methods, routines are further described in FIGS. 22-24.

If the pending application is approved, then the "YES" branch 1408 is followed to block 1610. In block 1610, a decisioned application can be displayed or otherwise output to a user 112a-n. In the embodiment shown in FIG. 16, a user 112a-n can be notified via a display device that that the pending application has been decisioned. A decision and associated decision information can be displayed to the user 112a-n via a user interface, such as the user interfaces 1200, 1300 shown and described in FIGS. 12 and 13.

After block 1610, the process 1600 ends.

Returning to decision block 1606, if the pending application is not approved, then the "NO" branch 1612 is followed to block 1614. In block 1614, a pending application can be granted manual approval by a user 112a-n such as a credit administrator. If the pending application is granted manual approval, then the "YES" branch 1616 is followed to block 1610.

Block 1610 is described above.

Returning to block 1614, if the pending application is not granted manual approval, the pending application is denied, and a corresponding notification can be transmitted to the user 112*a-n* regarding the denied application.

d. Trialing an Application

Prior to, or after, a decision is rendered for a particular form, application, request, or account, a user 112*a-n* can utilize the decision sub-engine 202 to test various strategies for scores, models, and processes. In one embodiment, a trailing/challenger component 234 of a decision sub-engine 202 can be utilized to test a challenger strategy for a particular application. The user 112*a-n* can then compare the challenger strategy to the current or "champion" strategy, and determine whether to modify or replace the current or "champion" strategy based in part on the analysis of the comparison.

FIG. 17 illustrates a process 1700 that can be implemented by the trailing/challenger component 234. In FIG. 17, the process 1700 begins at block 1702. In block 1702, one or more data sources 170*a-n* are selected for analysis. For example, a data source such as "Test Database 2" can be selected by the user 112*a-n*. Other examples of data sources that can be selected include, but are not limited to, test database 1, and archived production data.

Block 1702 is followed by block 1704, in which a particular rule set is selected for implementation with the selected data source. For example, a rule set such as "Models" can be selected by the user 112*a-n*. Other examples of riles sets that can be selected include, but are not limited to, scores, rules, and practices.

Block 1704 is followed by block 1706, in which an outcome or trial decision is stored. For example, an outcome or trial decision can be stored in a data storage device such as an analysis archive or application and decision database 172. The outcome or trial decision can be compared to a "champion" or current strategy, and the user 112*a-n* can then determine whether to alter the "champion" or current strategy or replace the "champion" or current strategy with a new rule set, or "challenger" strategy.

After block 1706, the process 1700 ends.

Figure 18:
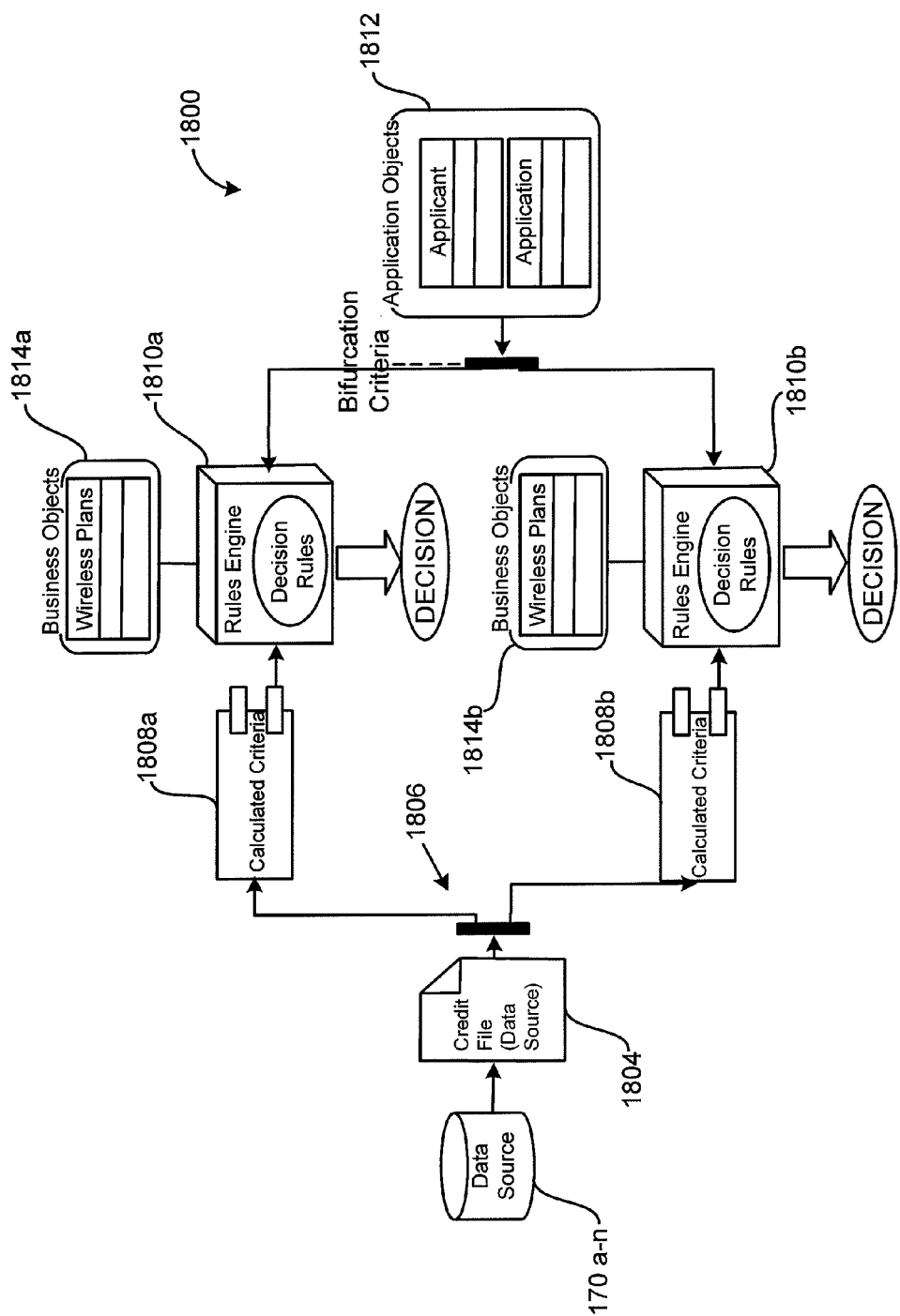

FIG. 18 illustrates another process 1800 that can be implemented by the trailing/challenger component 234. In FIG. 18, the process 1800 begins at block 1802. In block 1802, a particular data source 170*a-n* is selected. For example, a credit database can be selected by a user 112*a-n*.

Block 1802 is followed by block 1804, in which a particular credit file is selected from the data source 170*a-n*.

Block 1804 is followed by block 1806, in which the credit file or other data source response can follow one or more execution paths.

Block 1806 is followed by blocks 1808*a-b*, in which different attributes and/or criteria can be calculated for each path.

Blocks 1808*a-b* are followed by blocks 1810*a-b*, respectively, in which a rules engine can receive calculated attributes and/or criteria and an application, and a decision can be derived based at least in part on a selected strategy path. Note that an application or other application objects can be received from block 1812, and associated business objects can be received from blocks 1814*a-b*, respectively.

e. Generating a Business Process Model

In one embodiment, an automated application processing and decision engine can be utilized to implement a business process such as a business process model shown in FIG. 19.

FIG. 19 illustrates a process diagram that can be implemented by a workflow component 230. Diagrams such as the one shown in FIG. 19 are useful for constructing and implementing a business rule. The diagram illustrates a process 1900 with one or more business rules for completing processing of an application after a decision has been rendered. Each block 1902, 1904, 1906, 1908, 1910, 1912, 1914, and 1916 can represent a respective function or set of functions in a process for implementing one or more business rules. Other types of diagrams, functional blocks, and diagram components can be utilized in accordance with other embodiments of the invention.

FIG. 20 illustrates a process diagram that can be implemented by a workflow component 230. Diagrams such as the one shown in FIG. 20 are useful for constructing and implementing a business process.

The process 2000 shown begins at start block 2002.

Block 2002 is followed by block 2004, which is an activity block labeled "validate order." At this block, an order can be validated.

Block 2004 is followed by block 2006, which is a decision block labeled "Is valid." At this block 2006, a determination is made whether the order is valid. If a decision such as "True" or "Yes" is determined, then the process 2000 continues at block 2008.

At block 2008, there is an activity block labeled "Transform Order." At this block 2008, the order is transformed.

Block 2008 is followed by block 2010, which is an activity block labeled "Process Order." At this block 2010, the order is processed.

Block 2010 is followed by block 2012, which is an activity block "Transform Response." At this block 2012, an associated response is transformed.

Block 2012 is followed by block 2014, which is an email activity block labeled "Email Confirmation." At this block 2014, a confirmation e-mail or other communication associated with the order and/or response is transmitted.

Block 2014 is followed by block 2016, in which the process 2000 ends.

Referring back to decision block 2006, if a decision such as "False" or "No" is determined, then the process 2000 continues to block 2018.

At block 2018, there is an activity block labeled "Escalate Validation Failure." At this block 2108, a validation feature is escalated, and the process 2000 ends.

Each block 2002, 2004, 2006, 2008, 2010, 2012, 2014, 2016, and 2018 can represent a respective function or set of functions in a business process. Other types of diagrams, functional blocks, and diagram components can be utilized in accordance with other embodiments of the invention.

FIG. 21 illustrates another process diagram that can be implemented by a workflow component 230, for controlling workflow between a user interface, a rules engine component 220, a data resource layer 206, and a data analysis layer 208. In this embodiment, a custom workflow of a customer can be implemented and automatically executed by an application processing engine as governed by the process model itself. The process 2100 shown includes a graphic of a user interface 2102 associated with a start block 2104.

Block 2104 is followed by block 2106, which is labeled "Decision Prequalification (Rules)." A graphic of a user interface 2108 associated with block 2106 is also shown. In block 2106, a set of prequalification rules is generated or otherwise selected.

Block 2106 is followed by a decision block 2110, which is labeled "Prequalified?" In this block 2110, a determination is made whether a particular applicant is prequalified. If the a "true" or "Yes" determination is made, then the process 2100 continues to end block 2112. A graphic of a user interface 2114 associated with the end block 2112 is shown.

Referring back to decision block 2110, if a "false" or "No" determination is made, then the process 2100 continues to block 2116. Block 2116 is labeled "Riskwise Information Decisioning." A graphic of an interface 2118 associated with block 2116 is shown. At block 2116, a particular data source can be selectively accessed, such as an external data source.

Block 2116 is followed by decision block 2120, which is labeled "Sufficient Riskwise Score?" At this block 2120, a determination is made whether the particular applicant meets or exceeds a threshold score associated with a data source such as a RiskWise T database or routine, or a result of a function is evaluated. If a "false" or "No" determination is made, then a first response is received and forwarded to the following block. The process 2100 continues to end block 2112, where the process 2100 ends.

Referring back to decision block 2120, if a "true" or "Yes" determination is made, then the process 2100 continues to block 2122. Block 2122 is labeled "Credit Information Decisioning." Graphics of a user interface 2124 and an interface 2126 associated with block 2122 are shown. At block 2122, credit information decisioning can be performed. One or more data sources can be accessed, and associated analytics processes can be executed to perform the decisioning. The process 2100 continues to end block 2112, where the process 2100 ends.

Each block 2104, 2106, 2110, 2112, 2116, 2120, and 2122 can represent a respective function or set of functions in a business process. Other types of diagrams, functional blocks, user interfaces, interfaces, and diagram components can be utilized in accordance with other embodiments of the invention.

Methods

FIG. 22 illustrates a method implemented by an automated application processing and decision engine in accordance with various embodiments of the invention. In the embodiment shown in FIG. 22, a method 2200 for automating decisioning for a credit request associated with an applicant begins at block 2202.

At block 2202, a user computer interface adapted to receive information associated with an applicant, and further adapted to display and receive information associated with at least one decision rule is provided. For example, in the embodiment shown in FIG. 22, a user computer interface can be a graphical user interface. By way of further example in the embodiment shown, an applicant can include, but is not limited to, an individual, an entity, a business, and a commercial institution.

Block 2202 is followed by block 2204, in which information associated with the applicant is received through the user computer interface. For example, receiving information associated with an applicant can include, but is not limited to, receiving information from an applicant, receiving information entered by an applicant, receiving information from a device associated with an applicant, receiving information from a data source associated with an applicant, and receiving information selected by an applicant.

In the embodiment shown in FIG. 22, information associated with an applicant can include, but is not limited to, identity information associated with the applicant, access information to authorize access to credit data from at least one credit reporting agency, information associated with an applicant from at least one risk analysis data source, contact information associated with an applicant, name, current address, social security number, date of birth, an address, a name of a co-applicant, information associated with an applicant's spouse, information associated with an applicant's driver license, information associated with an applicant's employer, and information associated with applicant's income. Furthermore, information associated with an applicant can include, but is not limited to, credit reporting data, risk analysis data, check processing service data, blue book data, regional consumer exchange data, and commercial data. Information associated with an applicant can also include information that is relevant to a customer solution.

Block 2204 is followed by block 2206, in which information associated with the applicant is received from at least one data source. For example, receiving information associated with an applicant from at least one data source can include, but is not limited to, receiving information from a financial institution, receiving information from a credit provider, receiving information from a database, and receiving information from a credit reporting database.

Block 2206 is followed by block 2208, in which a selection of information associated with a plurality of decision rules is received through the user computer interface. In the example shown, the user computer interface can be used to define at least one decision rule in a near-natural language. Information associated with a plurality of decision rules can include, but is not limited to, an attribute, a criteria, a workflow, a rule hierarchy, a workflow hierarchy, credit data associated with an applicant, a score, a statistical model, a threshold, a risk factor, information associated with at least one attribute, information associated with at least one criteria, information associated with a process performed by an entity, information associated with a business associated with an entity, and information associated with an industry associated with an entity.

Block 2208 is followed by block 2210, in which a selection of rule flow information associated with a plurality of decision rules is received through the user computer interface. For example in the embodiment shown, a user can select information associated with a decision rule by positioning an object on a user computer interface such as a graphical user interface, wherein the object is associated with at least one decision rule. Selection of rule flow information associated with a plurality of decision rules can include, but is not limited to, information from a template associated with the user computer interface. A template can include, but is not limited to, information associated with a user's business, information associated with a user's industry, information associated with a prospective customer of a user, information associated with a current customer of a user, information collected by a user, and information obtained by a user.

Block 2210 is followed by block 2212, in which a plurality of decision rules based at least in part on the information associated with the applicant, based at least in part on the information associated with the applicant from at least one data source, and based at least in part on the selection of information associated with the plurality of decision rules, wherein an outcome associated with at least one of the plurality of decision rules can be obtained, is generated. In the embodiment shown in FIG. 22, an outcome can include, but is not limited to, denial of a credit line, granting an approval of a credit line, denial of a loan, granting approval of a loan, and approval for receiving an offer of credit.

Block 2212 is followed by block 2214, in which based in part on at least the rule flow information, displaying at least a portion of the plurality of decision rules through the user computer interface.

At block 2214, the method 2200 ends.

Figure 23:
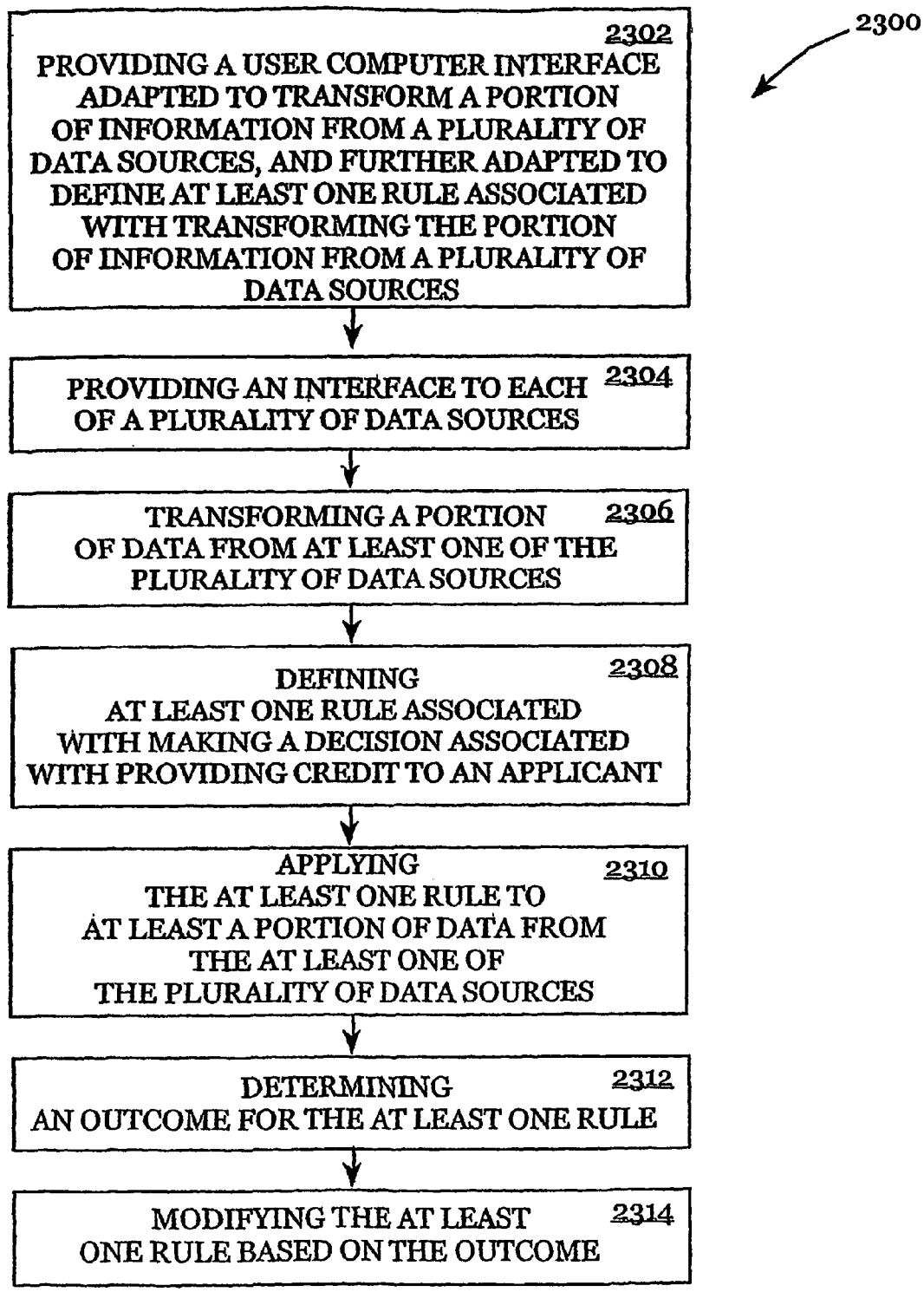

FIG. 23 illustrates another method implemented by an automated application processing and decision engine in accordance with various embodiments of the invention. In the embodiment shown in FIG. 23, a method 2300 for accessing a plurality of data sources for decisioning a credit request associated with an applicant begins at block 2302.

At block 2302, a user computer interface adapted to transform a portion of information from a plurality of data sources, and further adapted to define at least one rule associated with transforming the portion of information from the plurality of data sources, is provided.

Block 2302 is followed by block 2304, in which an interface to each of the plurality of data sources is provided.

Block 2304 is followed by block 2306, in which a portion of data is transformed from at least one of the plurality of data sources.

Block 2306 is followed by block 2308, in which at least one rule associated with making a decision associated with providing credit to an applicant is defined.

Block 2308 is followed by block 2310, in which the at least one rule is applied to at least a portion of data from the at least one of the plurality of data sources.

Block 2310 is followed by block 2312, in which an outcome is determined for the at least one rule.

Block 2312 is followed by block 2314, in which, the at least one rule is modified based on the outcome.

At block 2314, the method 2300 ends.

Figure 24:
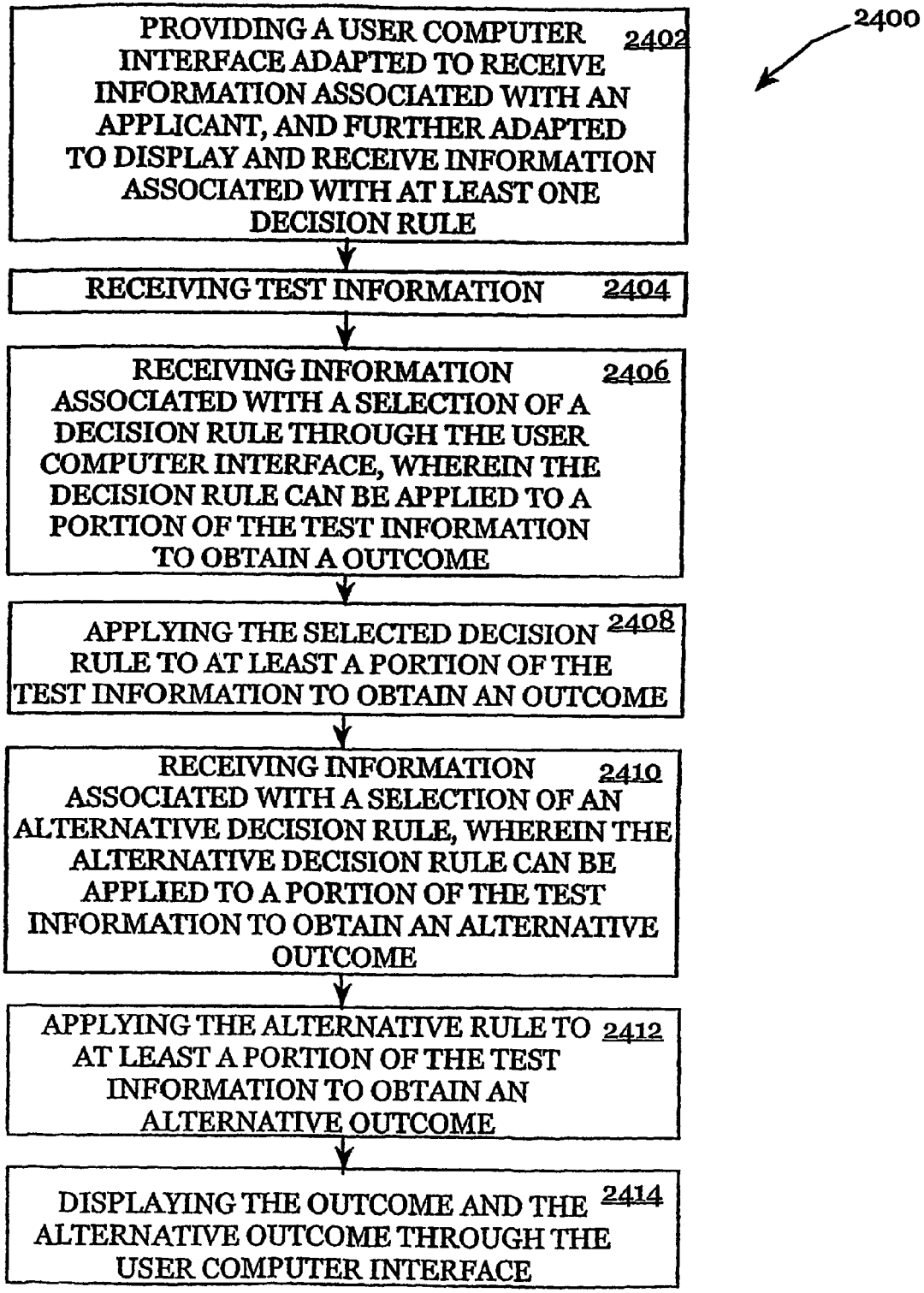

FIG. 24 illustrates a method implemented by an automated application processing and decision engine in accordance with various embodiments of the invention. In the embodiment shown in FIG. 24, a method 2400 for testing a decision rule for automated credit request decisioning associated with an applicant begins at block 2402.

At block 2402, a user computer interface adapted to receive information associated with an applicant, and further adapted to display and receive information associated with at least one decision rule, is provided. In at least one embodiment, the at least one decision rule can include a decision rule defined in near-natural language.

Block 2402 is followed by block 2404, in which test information is received.

Block 2404 is followed by block 2406, in which information associated with a selection of a decision rule through the user computer interface is received, wherein the decision rule can be applied to a portion of the test information to obtain an outcome.

Block 2406 is followed by block 2408, in which the selected decision rule is applied to at least a portion of the test information to obtain an outcome.

Block 2408 is followed by block 2410, in which information associated with a selection of an alternative decision rule is received, wherein the alternative decision rule can be applied to a portion of the test information to obtain an alternative outcome.

Block 2410 is followed by block 2412, in which the alternative rule is applied to at least a portion of the test information to obtain an alternative outcome.

Block 2412 is followed by block 2414, in which the outcome and alternative outcome are displayed through the user computer interface.

At block 2414, the method 2400 ends.

While the above description contains many specifics, these specifics should not be construed as limitations on the scope of the invention, but merely as exemplifications of the disclosed embodiments. Those skilled in the art will envision any other possible variations that are within the scope of the invention.

The claimed invention is:

1. A method for generating a rule for automated credit request decisioning, comprising:
   receiving information associated with an applicant through a user interface;
   configuring, by a server device, the user interface to allow a user to define a plurality of decision rules in a near-natural language;
   receiving the plurality of decision rules in the near-natural language, the plurality of decision rules being received from the user through the user interface;
   determining information associated with the plurality of decision rules based on the plurality of decision rules in the near-natural language;
   generating a decision flow in response to receiving an identification from the user through the user interface of a flow element, of a decision block, and of a flow path for connecting to at least one of the decision block or the flow element, the decision flow comprising the flow element, the decision block, and the flow path;
   receiving data associated with the applicant from at least one data source;
   determining, by the server device, a decision for the applicant based on the information associated with the applicant, the data associated with the applicant from at least one data source, the information associated with the plurality of decision rules determined based on the plurality of decision rules in the near-natural language, and the decision flow, wherein determining the decision for the applicant comprises applying in accordance with the decision flow an executable version of the information associated with the plurality of decision rules in the near-natural language to the data associated with the applicant from at least one data source; and
   providing the decision to the user interface.

2. The method of claim 1, wherein the user interface comprises a graphical user interface having an object associated with at least one of the plurality of decision rules, the method further comprising:
   receiving, through the graphical user interface, a selection by the user of information associated with the at least one of the plurality of decision rules by receiving a position of the object.

3. The method of claim 2, wherein receiving the position of the object comprises receiving a signal associated with positioning the object on the graphical user interface, wherein the object is associated with the at least one of the plurality of decision rules.

4. The method of claim 1, wherein the applicant is one of: an individual, an entity, a business, or a commercial institution.

5. The method of claim 1, wherein information associated with the plurality of decision rules comprises at least one of the following: an attribute, a criteria, a workflow, a rule hierarchy, a workflow hierarchy, credit data associated with an applicant, a score, a statistical model, a threshold, a risk factor, information associated with at least one attribute, information associated with at least one criteria, information associated with a process performed by an entity, information associated with a business associated with an entity, and information associated with an industry associated with an entity.

6. The method of claim 1, further comprising:
   applying at least one of the plurality of decision rules to at least a portion of the information associated with the applicant to obtain an outcome associated with the at least one of the plurality of decision rules;

generating a test outcome associated with the at least one of the plurality of decision rules; and displaying the test outcome on the user interface.

7. The method of claim 6, wherein generating the test outcome associated with the at least one of the plurality of decision rules further comprises: modifying the at least one of the plurality of decision rules based at least in part on information associated with the outcome.

8. The method of claim 6, further comprising:

receiving a selection of information associated with an alternative decision rule through the user interface;

generating an alternative decision rule based at least on the selection of information associated with the alternative decision rule through the user interface;

applying the alternative decision rule to at least a portion of the information associated with the applicant, wherein an alternative outcome associated with the alternative decision rule is obtained; and displaying the alternative outcome on the user interface.

9. The method of claim 1, wherein the decision comprises at least one of:

denial of a credit line;

granting an approval of a credit line;

denial of a loan;

granting approval of a loan; or granting approval for providing the applicant with an offer of credit.

10. The method of claim 1, further comprising receiving through a template associated with the user interface the flow element, the decision block, and the flow path.

11. The method of claim 10, wherein the template comprises at least one of the following: information associated with a user's business, information associated with a user's industry, information associated with a prospective customer of a user, information associated with a current customer of a user, information collected by a user, and information obtained by a user.

12. The method of claim 1, wherein the user interface comprises at least one of the following: information associated with a user's industry, information associated with a user's business, information associated with a prospective customer of a user, information associated with a current customer of a user, information collected by a user, and information obtained by a user.

13. The method of claim 1, wherein receiving information associated with an applicant through the user interface comprises at least one of the following: receiving information from an applicant, receiving information entered by an applicant, receiving information from a device associated with an applicant, receiving information from a data source associated with an applicant, and receiving information selected by an applicant.

14. The method of claim 1, wherein receiving data associated with an applicant from at least one data source comprises at least one of the following: receiving information from a financial institution, receiving information from a credit provider, receiving information from a database, and receiving information from a credit reporting database.

15. The method of claim 1, wherein data associated with an applicant comprises at least one of the following: identity information associated with the applicant, access information to authorize access to credit data from at least one credit reporting agency, information associated with an applicant from at least one risk analysis data source, contact information associated with an applicant, name, current address, social security number, date of birth, an address, a name of a co-applicant, information associated with an applicant's spouse, information associated with an applicant's driver license, information associated with an applicant's employer, and information associated with applicant's income.

16. The method of claim 1, wherein data associated with an applicant comprises at least one of the following: credit reporting data, risk analysis data, check processing service data, blue book data, regional consumer exchange data, and commercial data.

17. A non-transitory computer-readable medium for generating a rule for automated credit request decisioning, comprising program code executable by a processor, the program code comprising:

program code for receiving information associated with an applicant through a user interface;

program code for receiving data associated with the applicant from at least one data source;

program code for configuring the user interface to allow the user to define a plurality of decision rules in a near-natural language;

program code for determining information associated with the plurality of decision rules based on the plurality of decision rules in the near-natural language defined by the user;

program code for generating a decision flow in response to receiving an identification from the user through the user interface of a flow element, of a decision block, and of a flow path for connecting to at least one of the decision block or the flow element, the decision flow comprising the flow element, the decision block, and the flow path;

program code for determining a decision for the applicant based on the information associated with the applicant, the data associated with the applicant from at least one data source, the information associated with the plurality of decision rules determined based on the plurality of decision rules in the near-natural language, and the decision flow, wherein program code for determining the decision for the applicant comprises program code for applying in accordance with the decision flow an executable version of the information associated with the plurality of decision rules in the near-natural language to the data associated with the applicant from at least one data source; and program code for providing the decision to the user interface.

18. The non-transitory computer-readable medium of claim 17, further comprising: program code for providing the user interface that comprises a graphical user interface having an object associated with at least one of the plurality of decision rules; and program code for receiving, through the graphical user interface, a selection by the user of information associated with the at least one of the plurality of decision rules by receiving a position of the object.

19. The non-transitory computer-readable medium of claim 18, wherein program code for receiving, through the graphical user interface, a selection by the user of information associated with the at least one of the plurality of decision rules by receiving a position of the object comprises program code for receiving a signal associated with positioning the object on the graphical user interface, wherein the object is associated with the at least one of the plurality of decision rules.

20. The computer-readable medium of claim 17, wherein the applicant is one of: an individual, an entity, a business, or a commercial institution.

21. The non-transitory computer-readable medium of claim 17, wherein information associated with the plurality of decision rules comprises at least one of the following: an attribute, a criteria, a workflow, a rule hierarchy, a workflow hierarchy, credit data associated with an applicant, a score, a statistical model, a threshold, a risk factor, information associated with at least one attribute, information associated with at least one criteria, information associated with a process performed by an entity, information associated with a business associated with an entity, and information associated with an industry associated with an entity.

22. The non-transitory computer-readable medium of claim 17, further comprising: program code for applying at least one of the plurality of decision rules to at least a portion of the information associated with the applicant to obtain an outcome associated with the at least one of the plurality of decision rules; program code for generating a test outcome associated with the at least one of the plurality of decision rules; and program code for displaying the test outcome on the user interface.

23. The non-transitory computer-readable medium of claim 22, wherein program code for generating the test outcome associated with the at least one of the plurality of decision rules further comprises: program code for modifying the at least one of the plurality of decision rules based at least in part on information associated with the outcome.

24. The non-transitory computer-readable medium of claim 22, further comprising: program code for receiving a selection of information associated with an alternative decision rule through the user interface; program code for generating an alternative decision rule based at least on the selection of information associated with the alternative decision rule through the user interface; program code for applying the alternative decision rule to at least a portion of the information associated with the applicant, wherein an alternative outcome associated with the alternative decision rule is obtained; and program code for displaying the alternative outcome on the user interface.

25. The non-transitory computer-readable medium of claim 17, wherein the decision comprises at least one of: denial of a credit line; granting an approval of a credit line; denial of a loan; granting approval of a loan; or granting approval for providing the applicant with an offer of credit.

26. The non-transitory computer-readable medium of claim 17, further comprising program code for receiving through a template associated with the user interface the flow element, the decision block, and the flow path.

27. The non-transitory computer-readable medium of claim 26, wherein the template comprises at least one of the following: information associated with a user's business, information associated with a user's industry, information associated with a prospective customer of a user, information associated with a current customer of a user, information collected by a user, and information obtained by a user.

28. The non-transitory computer-readable medium of claim 17, wherein the user interface comprises at least one of the following: information associated with a user's industry, information associated with a user's business, information associated with a prospective customer of a user, information associated with a current customer of a user, information collected by a user, and information obtained by a user.

29. The non-transitory computer-readable medium of claim 17, wherein program code for receiving information associated with an applicant through the user interface comprises at least one of the following: program code for receiving information from an applicant, program code for receiving information entered by an applicant, program code for receiving information from a device associated with an applicant, program code for receiving information from a data source associated with an applicant, and program code for receiving information selected by an applicant.

30. The non-transitory computer-readable medium of claim 17, wherein program code for receiving data associated with an applicant from at least one data source comprises at least one of the following: program code for receiving information from a financial institution, program code for receiving information from a credit provider, program code for receiving information from a database, and program code for receiving information from a credit reporting database.

31. The non-transitory computer-readable medium of claim 17, wherein data associated with an applicant comprises at least one of the following: identity information associated with the applicant, access information to authorize access to credit data from at least one credit reporting agency, information associated with an applicant from at least one risk analysis data source, contact information associated with an applicant, name, current address, social security number, date of birth, an address, a name of a co-applicant, information associated with an applicant's spouse, information associated with an applicant's driver license, information associated with an applicant's employer, and information associated with applicant's income.

32. The non-transitory computer-readable medium of claim 17, wherein data associated with an applicant comprises at least one of the following: credit reporting data, risk analysis data, check processing service data, blue book data, regional consumer exchange data, and commercial data.

33. A system for generating a rule for automated credit request decisioning, comprising:
a processor for executing stored instructions to
receive information associated with an applicant through a user interface;
receive data associated with the applicant from at least one data source;
configure the user interface to allow the user to define a plurality of decision rules in a near-natural language;
determine information associated with the plurality of decision rules based on the plurality of decisions rules in the near-natural language;
generate a decision flow in response to receiving an identification from the user through the user interface of a flow element, of a decision block, and of a flow path for connecting to at least one of the decision block or the flow element, the decision flow comprises the flow element, the decision block, and the flow path;
determine a decision for the applicant based on the information associated with the applicant, the data associated with the applicant from at least one data source, the information associated with the plurality of decision rules determined based on the plurality of decision rules in the near-natural language, and the decision flow by applying in accordance with the decision flow an executable version of the information associate with the plurality of decision rules in the near-natural language to the data associated with the applicant from at least one data source; and
provide the decision to the user interface.

34. The system of claim 33, wherein the processor is configured to execute stored instructions to apply in accordance with the plurality of decision rules in the near-natural language to the data associated with the applicant from at least one data source to generate a decision for the applicant by:
determining a series of execution steps from the decision rule associated with the plurality of decision rules;

in accordance with the series of execution steps, generating at least one attribute representing a statistical aggregation of at least one of (i) the data associated with the applicant from at least one data source; or (ii) the information associated with the applicant; and applying the information associated with the plurality of decision rules on the at least one attribute to generate the decision, the decision comprising one of:
denial of a credit line;
granting an approval of a credit line;
denial of a loan;
granting approval of a loan; or
approval for receiving an offer of credit.

35. The system of claim 33, wherein the processor is adapted to configure the user interface to allow the user to define the plurality of decision rules in the near-natural language by:
displaying a plurality of elements for constructing at least one of the plurality of decision rules, the plurality of elements comprising decision tables, exclusionary rules, rule flows, template libraries, and a deployer;
receiving a selection by the user, the selection comprising at least part of the plurality of elements;
receiving an attribute or a criteria associated with the selection by the user; and
constructing a graphical representation of the at least one of the plurality of decision rules using the selection by the user and the attribute or the criteria.

36. The system of claim 33, wherein the processor is configured to execute stored instructions to compare the information associated with the applicant with at least some of the data associated with the applicant from the at least one data source to determine if the information associated with the applicant is valid.

* * * * *